United States Patent
Shiba et al.

(10) Patent No.: US 10,901,401 B2
(45) Date of Patent: Jan. 26, 2021

(54) PLAN GENERATION APPARATUS, METHOD AND COMPUTER READABLE MEDIUM FOR MULTI-PROCESS PRODUCTION OF INTERMEDIATE PRODUCT

(71) Applicant: Mitsubishi Electric Corporation, Tokyo (JP)

(72) Inventors: Mitsuteru Shiba, Tokyo (JP); Akifumi Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 132 days.

(21) Appl. No.: 16/063,433

(22) PCT Filed: Jan. 15, 2016

(86) PCT No.: PCT/JP2016/051101
§ 371 (c)(1),
(2) Date: Jun. 18, 2018

(87) PCT Pub. No.: WO2017/122340
PCT Pub. Date: Jul. 20, 2017

(65) Prior Publication Data
US 2019/0018397 A1 Jan. 17, 2019

(51) Int. Cl.
*G05B 19/418* (2006.01)
*G05B 23/02* (2006.01)

(52) U.S. Cl.
CPC ..... *G05B 19/41875* (2013.01); *G05B 19/418* (2013.01); *G05B 19/41865* (2013.01);
(Continued)

(58) Field of Classification Search
CPC .... G05B 19/41875; G05B 2219/32194; G05B 2219/45031; G05B 2219/32015;
(Continued)

(56) References Cited

U.S. PATENT DOCUMENTS

| 5,111,404 | A | * | 5/1992 | Kotani | ............. G05B 19/41875 |
| | | | | | 700/108 |
| 5,150,289 | A | | 9/1992 | Badavas | |

(Continued)

FOREIGN PATENT DOCUMENTS

| JP | 8-215957 A | 8/1996 |
| JP | 10-163080 A | 6/1998 |

(Continued)

OTHER PUBLICATIONS

International Search Report for PCT/JP2016/051101 (PCT/ISA/210) dated Mar. 15, 2016.

(Continued)

*Primary Examiner* — Darrin D Dunn
(74) *Attorney, Agent, or Firm* — Birch, Stewart, Kolasch & Birch, LLP

(57) ABSTRACT

Provided are a correlation determination unit to set, as a first apparatus, one apparatus among a plurality of apparatuses, set, as a first quality value, a quality value indicating a quality of an intermediate product processed by the first apparatus, set, as a second apparatus, an apparatus among the plurality of apparatuses that belongs to a process prior to the process to which the first apparatus belongs, set, as a second quality value, a quality value of an intermediate product processed by the second apparatus and determine whether correlation exists between the first quality value and the second quality value; a set determination unit to determine, using a quality standard value BQ indicating a standard of quality of the intermediate product, whether the first apparatus and the second apparatus are a set of apparatuses for which a first error between the first quality value and the quality standard value BQ and a second error between the second quality value and the quality standard value BQ cancel each other out when it is determined that correlation exists between the first quality value and the second quality (Continued)

value; and a process plan generation unit to generate a process plan using the set of apparatuses.

11 Claims, 11 Drawing Sheets

(52) U.S. Cl.
CPC ..... *G05B 23/0235* (2013.01); *G05B 23/0237* (2013.01); *Y02P 90/02* (2015.11)

(58) Field of Classification Search
CPC .......... G05B 2219/32191; G05B 2219/32179; G05B 2219/32187; G05B 2219/32368; Y02P 90/22; Y02P 90/20; Y02P 90/86
See application file for complete search history.

(56) References Cited

U.S. PATENT DOCUMENTS

| | | | | |
|---|---|---|---|---|
| 5,229,948 | A * | 7/1993 | Wei | G05B 19/41885 700/99 |
| 7,171,283 | B2 * | 1/2007 | Popp | G05B 19/042 700/121 |
| 7,251,578 | B1 * | 7/2007 | Chen | H04L 1/20 702/127 |
| 7,437,208 | B2 * | 10/2008 | Muench | G05B 19/41875 162/263 |
| 7,558,638 | B2 * | 7/2009 | Chang | G05B 19/4184 700/97 |
| 7,587,804 | B2 * | 9/2009 | Steinhilper | G05B 19/41865 29/430 |
| 9,536,796 | B2 * | 1/2017 | Bickford | H01L 22/12 |
| 2002/0082738 | A1 * | 6/2002 | Goldman | G05B 19/41865 700/109 |
| 2002/0087438 | A1 * | 7/2002 | Kunieda | G06Q 10/087 705/28 |
| 2002/0143417 | A1 * | 10/2002 | Ito | G05B 19/41865 700/95 |
| 2003/0150909 | A1 * | 8/2003 | Markham | B23Q 35/12 235/376 |
| 2003/0154144 | A1 * | 8/2003 | Pokorny | G05B 13/0285 705/28 |
| 2003/0155415 | A1 * | 8/2003 | Markham | G06Q 10/00 235/376 |
| 2005/0033464 | A1 * | 2/2005 | Nguyen | G05B 19/41875 700/108 |
| 2005/0043841 | A1 * | 2/2005 | Popp | A61F 13/15772 700/110 |
| 2005/0234586 | A1 * | 10/2005 | Agapiou | G05B 19/41875 700/159 |
| 2005/0246045 | A1 * | 11/2005 | Sugihara | G06Q 10/06 700/109 |
| 2005/0278052 | A1 * | 12/2005 | Bett | G05B 23/0229 700/108 |
| 2006/0047454 | A1 * | 3/2006 | Tamaki | G06Q 10/06 702/84 |
| 2006/0102858 | A1 * | 5/2006 | Fujii | G01N 21/88 250/559.45 |
| 2006/0136085 | A1 * | 6/2006 | Steinhilper | G05B 19/41865 700/111 |
| 2006/0167579 | A1 * | 7/2006 | Fujii | G06Q 50/04 700/109 |
| 2006/0191993 | A1 * | 8/2006 | Markham | G06Q 10/00 235/376 |
| 2006/0218107 | A1 * | 9/2006 | Young | G05B 13/027 706/13 |
| 2006/0224263 | A1 * | 10/2006 | Arai | G06Q 10/06 700/95 |
| 2006/0293775 | A1 | 12/2006 | Ono et al. | |
| 2007/0059838 | A1 * | 3/2007 | Morrison | F25J 3/0219 436/55 |
| 2007/0198135 | A1 * | 8/2007 | Chang | G05B 19/4184 700/300 |
| 2008/0270058 | A1 * | 10/2008 | Fujii | G05B 23/024 702/83 |
| 2009/0112343 | A1 * | 4/2009 | Yuan | G05B 19/41865 700/101 |
| 2009/0112350 | A1 * | 4/2009 | Yuan | G05B 19/41835 700/117 |
| 2009/0204249 | A1 * | 8/2009 | Koch | G05B 19/4097 700/108 |
| 2011/0040399 | A1 * | 2/2011 | Lu | G05B 13/024 700/102 |
| 2011/0098862 | A1 * | 4/2011 | Andrei | G05B 13/042 700/272 |
| 2011/0166683 | A1 * | 7/2011 | Vazquez | G05B 19/41865 700/100 |
| 2012/0052600 | A1 | 3/2012 | Kamimura et al. | |
| 2012/0136470 | A1 * | 5/2012 | Deans | G05B 19/41875 700/110 |
| 2013/0233922 | A1 * | 9/2013 | Schoening | G06Q 10/087 235/385 |
| 2014/0344013 | A1 * | 11/2014 | Karty | G06Q 30/0201 705/7.29 |
| 2016/0026177 | A1 * | 1/2016 | Lam | G05B 19/4187 700/109 |
| 2016/0207657 | A1 * | 7/2016 | Petri | G01G 11/08 |
| 2017/0329317 | A1 * | 11/2017 | Ferry | G05B 19/41875 |
| 2018/0173209 | A1 * | 6/2018 | Iseli | G01B 21/04 |
| 2018/0267521 | A1 * | 9/2018 | Ferry | G06Q 50/04 |
| 2018/0284739 | A1 * | 10/2018 | Ueda | G07C 3/146 |
| 2018/0356796 | A1 * | 12/2018 | Godfrey | G05B 19/4099 |
| 2019/0018397 | A1 * | 1/2019 | Shiba | G05B 23/0235 |
| 2019/0100381 | A1 * | 4/2019 | Schmitz | G05B 19/41875 |
| 2019/0155258 | A1 * | 5/2019 | Unagami | G06F 11/14 |
| 2019/0223337 | A1 * | 7/2019 | Mori | G05B 19/41875 |
| 2019/0340740 | A1 * | 11/2019 | Li | G01J 3/463 |
| 2019/0354090 | A1 * | 11/2019 | Oyama | G05B 23/0283 |
| 2020/0047391 | A1 * | 2/2020 | Lettowsky | B29C 48/08 |

FOREIGN PATENT DOCUMENTS

| | | |
|---|---|---|
| JP | 11-267952 A | 10/1999 |
| JP | 2002-251212 A | 9/2002 |
| JP | 2006-65598 A | 3/2006 |
| JP | 2006-293658 A | 10/2006 |
| JP | 2011-107882 A | 6/2011 |
| JP | 2012-049373 A | 3/2012 |
| JP | 5012660 B2 | 8/2012 |

OTHER PUBLICATIONS

Indian Office Action, dated Feb. 28, 2020, for corresponding Indian Application No. 201847023308, with an English translation.
German Office Action for German Application No. 11 2016 005 697.4, dated Oct. 1, 2020, with English Translation.

* cited by examiner

Fig. 6

161: CORRELATION COEFFICIENT INFORMATION

| QUALITY VALUES PRIOR TO PROCESS X | CORRELATION COEFFICIENTS FOR QUALITY VALUE Q1_x3 |
|---|---|
| Q1 | 0.1 |
| Q2 | -0.1 |
| ⋮ | |
| Q1_a1 | 0.7 |
| Q1_a2 | -0.2 |
| ⋮ | |
| Q1_b1 | 0 |
| Q1_b2 | 0.4 |
| ⋮ | |

| QUALITY VALUES PRIOR TO PROCESS X | CORRELATION COEFFICIENTS FOR QUALITY VALUE Q2_x3 |
|---|---|
| Q1 | 0 |
| Q2 | 0.1 |
| ⋮ | |
| Q1_a1 | 0.2 |
| Q1_a2 | -0.8 |
| ⋮ | |
| Q1_b1 | -0.3 |
| Q1_b2 | 0.1 |
| ⋮ | |

PLAN GENERATION APPARATUS, METHOD AND COMPUTER READABLE MEDIUM FOR MULTI-PROCESS PRODUCTION OF INTERMEDIATE PRODUCT

TECHNICAL FIELD

The present invention relates to a plan generation apparatus, a plan generation method, and a plan generation program for generating a process plan to optimize the quality of a product produced in a production facility.

BACKGROUND ART

Production facilities and production lines in factories are typically configured from a plurality of production apparatuses. Each of this plurality of production apparatuses is responsible for specific processing and inspection functions. These production apparatuses receive intermediate products such as intermediate goods or parts from the preceding process, carry out the processing of the process to which the intermediate product was received, and pass the processed intermediate product to the next process. Typically, when processing using production apparatuses, each time work/processing is carried out, a certain degree of variation occurs in physical size, electrical characteristics such as resistance values, and/or other attributes of the intermediate product. Furthermore, even in cases where the plurality of production apparatuses perform the same processing, these variations demonstrate different distributions.

PTL 1 discloses a production management system in which product combination information, for optimizing the results of processing for a plurality of processing processes, is saved in advance in an external storage device. With this production management system, inspection and measurement results information for each inspection process of the product to be produced is saved. This production management system determines a combination of the production apparatuses on the basis of the product combination information and the inspection and measurement results information.

PTL2 discloses a process plan creation system including a database in which quality information of an intermediate product produced via an apparatus path is stored for each apparatus path configured from individual production apparatus for each process. The process plan creation system includes quality distribution estimation means that statistically estimate quality distribution information, which differs depending on the combination of the production apparatuses, by acquiring the quality information from the database. Additionally, this process plan creation system determines, on the basis of the quality distribution obtained by the quality distribution estimation means, a combination of production apparatuses that satisfies a quality standard. Moreover, the process plan creation system uses the determined combination of production apparatuses to decide the apparatus path.

PTL 3 discloses product quality prediction in which quality is defined by a number of defects or a number of defective items of a product, and this quality is formulated as a linear regression equation on the basis of production conditions and a regression coefficient obtained by linearly combining the production conditions. In this product quality prediction, quality is predicted by expressing the variation of the production conditions using a probability density function, expressing the conditions among the production conditions that cannot be dynamically controlled as conditional probabilities, and making a probability calculation for quality using the linear regression equation.

CITATION LIST

Patent Literature

PTL 1: JP-A-11-267952
PTL 2: JP-A-2011-107882
PTL 3: Japanese patent No. 5,012,660

SUMMARY OF INVENTION

Technical Problem

In cases where there are a plurality of apparatus paths capable of achieving the same processing and inspection processing at a production site such as a factory, the quality of the final product cannot be predicted by simply stacking the quality trends demonstrated by each individual production apparatus of the apparatus path. Here, the phrase "simply stacking" means creating an apparatus path by collecting and combining apparatuses which, as individual apparatuses, demonstrate the best values of quality indicator values. Intuitively speaking, it is presumed that final products produced by such an apparatus path will tend to have the best quality. However, in actuality, there are cases where correlation exists between the quality indicators confirmed in each inspection process, and there are cases of combinations that ultimately outperform the combination of the best production apparatuses, even though the individual quality of each production apparatus may not be the best. Thus, individually improving the quality of each production apparatus does not necessarily contribute to an improvement in the quality of the final product.

With PTL 1, optimal combinations for pluralities of production apparatuses that have correlation must be prepared in advance. In order to make such preparations, understanding of the correlations between the production apparatuses, based on the knowledge and experience of the product designer or the production facility designer, is necessary, and it is difficult to keep up with changes resulting from process improvements implemented through daily improvement initiatives. Additionally, when introducing a new production apparatus, a person must ascertain the quirks and tendencies of that production apparatus while using it, which requires a long period of time.

With PTL 2, since quality information of the apparatus path that is actually used is stored and utilized, there is no information for apparatus paths that have not been executed, and such apparatus paths are not considered as candidates for the apparatus path. Therefore, with PTL 2, there is a possibility that the optimal apparatus path will not be selected.

PTL 3 uses regression analysis to formulate the quality of the product, but correlation between the quality indicators is not taken into consideration and, as such, when there is strong correlation between the quality indicators, the derived quality may be inaccurate.

Therefore, a purpose of the invention is to generate a process plan that uses production apparatuses for which quality is statistically optimal by extracting correlation between the production apparatuses from information of production facility tests, even in cases where information on the production apparatuses that have correlation does not exist.

Solutions to Problem

A plan generation apparatus that generates a process plan of a product to be produced via a plurality of processes, the plan generation apparatus apparatus according to the present invention includes:

a correlation determination unit to
define a first apparatus as one apparatus among a plurality of apparatuses, each apparatus of the plurality of apparatuses that belongs to one of the plurality of processes,
define a first quality value as a quality value indicating a quality of an intermediate product processed by the first apparatus,
define a second apparatus as an apparatus among the plurality of apparatuses that belongs to a process prior to the process to which the first apparatus belongs,
define a second quality value as a quality value of an intermediate product processed by the second apparatus, and
determine whether correlation exists between the first quality value and the second quality value;
a set determination unit to determine, using a quality standard value indicating a standard of quality of the intermediate product, whether the first apparatus and the second apparatus are a set of apparatuses for which a first error between the first quality value and the quality standard value and a second error between the second quality value and the quality standard value cancel each other out when it is determined that correlation exists between the first quality value and the second quality value; and
a process plan generation unit to generate the process plan using the set of apparatuses when it is determined that the first apparatus and the second apparatus are the set of apparatuses.

Advantageous Effects of Invention

The plan generation apparatus according to the invention determines the correlation for combinations of apparatuses, determines a set of apparatuses, from among the combinations of apparatuses that have correlation, for which variations in the quality of the intermediate products cancel each other out, and generates a process plan using this set of apparatuses. As a result, the plan generation apparatus can automatically extract a set of apparatuses that produces high-quality intermediate products with little variation in quality, and can generate a process plan using the extracted set of apparatuses. Thus, this plan generation apparatus enables the automatic generation of an optimal process plan in a short period of time.

BRIEF DESCRIPTION OF DRAWINGS

FIG. 6 is a drawing illustrating an example of correlation coefficient information 161 generated by the correlation determination processing S120 according to the first embodiment;

DESCRIPTION OF EMBODIMENTS

First Embodiment

*Description of Configuration*

Figure 1:
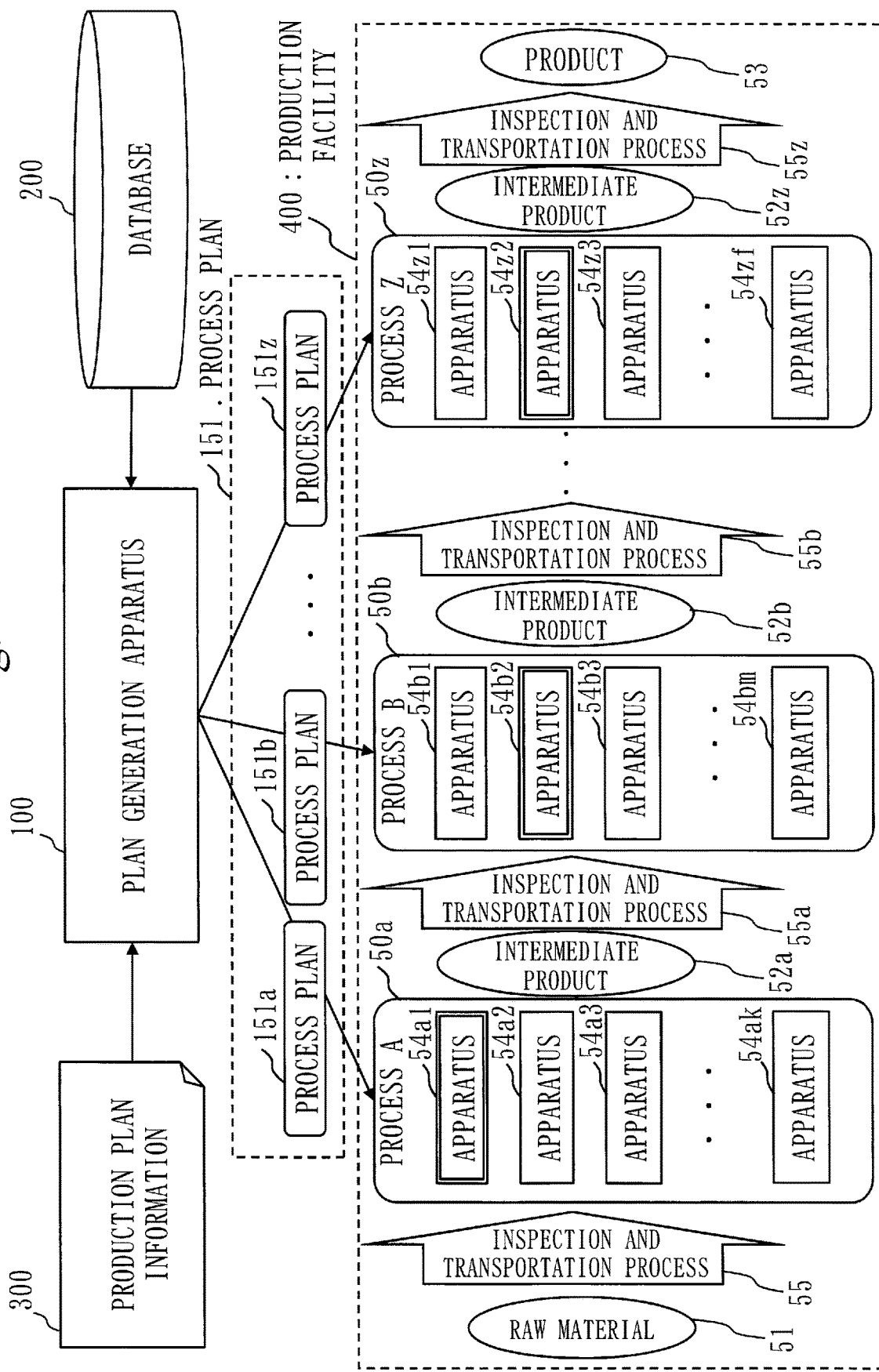
FIG. 1 is a drawing illustrating the relationship between a production facility 400 and a plan generation apparatus 100 according to a first embodiment.

The relationship between a production facility 400 and a plan generation apparatus 100 according to the present embodiment will be described while referencing FIG. 1.

The plan generation apparatus 100 generates a process plan 151 for a product 53 to be produced via a plurality of processes 50. In FIG. 1, there is a process A50a, a process B50b, ..., and a process Z50z.

The plan generation apparatus 100 acquires production plan information 300 and, as a result, obtains plan values of quality standard information and production volume included in the production plan information 300. Additionally, the plan generation apparatus 100 obtains quality information of each apparatus from a database 200. The plan generation apparatus 100 uses the obtained information to derive appropriate assignments for the apparatuses, and provides the process plan 151 for each process.

FIG. 1 is a drawing that illustrates from a point of introducing a raw material 51 into the production facility 400 to a point of outputting as the product 53. There are also cases where the product 53 is a part.

The production facility 400 is provided with a plurality of apparatuses 54. Each apparatus of the plurality of apparatuses 54 belongs to one of the plurality of processes 50. Herein, the processes 50 are also referred to as processing processes or production processes. Additionally, the apparatuses 54 are also referred to as processing apparatuses or production apparatuses.

The process A50a includes, as the apparatuses 54, a machine No. Al, which is an apparatus $54a1$, to a machine No. Ak, which is an apparatus $54ak$. The process B50b includes, as the apparatuses 54, a machine No. B1, which is an apparatus $54b1$, to a machine No. Bm, which is an apparatus $54bm$. The process Z50z includes, as the apparatuses 54, a machine No. Z1, namely an apparatus $54z1$, to a machine No. Zf, which is an apparatus $54zf$. Here, the letters k, m, f, and n (described later) are any integer and represent the numbers of the apparatuses installed in each process.

The raw material 51 is inspected and transported to a process A in an inspection and transportation process 55.

The process A is configured such that the processing of the process A is performed in parallel by the apparatuses of the apparatus 54*a*1 to the apparatus 54*ak*. A process B through a process Z have similar configurations.

An intermediate product 52*a* processed by the process A is inspected by an inspection and transportation process 55*a* and transported to the apparatus 54*b*1 to the apparatus 54*bm* of the process B. The process B has a similar configuration. An intermediate product 52*z* processed by the process Z, which is the final process, is inspected by an inspection and transportation process 55*z*, and the intermediate product 52*z* that has passed the inspection is transported as the product 53, which is the final product.

In each of the inspection and transportation processes 55, a predetermined quality value is measured for the intermediate product 52 to be inspected and transported. The quality value is an indicator value representing the quality of the intermediate product 52. The quality value is also referred to as a quality indicator value. There is at least one quality value and, typically, there are multiple quality values. In the inspection and transportation processes 55, whether the quality value is within a range of acceptable values is determined on the basis of a predetermined quality standard value BQ. The quality standard value BQ represents the standard of quality of the intermediate product 52. Specific examples of the quality value include the size of the intermediate product and the number of scratches on the intermediate product.

Intermediate products 52 that have passed inspection in the inspection process of the inspection and transportation processes 55 are transported to the next process. Intermediate products 52 that fail in the inspection process are transported to a different process in order to determine whether to dispose of the intermediate product 52 or reprocess the intermediate product 52 to pass the inspection.

The apparatus 54*a*1, the apparatus 54*b*2, . . . , and the apparatus 54*z*2 surrounded by double solid lines in FIG. 1 illustrate an example of an apparatus path of a product or product lot.

Here, the term "apparatus path" means a combination of the apparatuses 54 used in each of the processes 50. When each of the processes 50 include a plurality of the apparatuses 54 that have identical functions, one of these apparatuses 54 is selected for actual production. Specifically, in the example described above, this means that one apparatus path is generated by selecting the apparatus 54*a*1 from the apparatus group of the process A, selecting the apparatus 54*b*2 from the apparatus group of the process B, and selecting the apparatus 54*z*2 from the apparatus group of the process Z.

Provided that the processing results of the apparatuses are identical, it should be possible to produce final products 53 of the same quality, regardless of which apparatuses are selected. However, typically, there is a certain degree of variation in the quality of the products 53, even when all of the inspection processes have been passed.

Note that, in FIG. 1, for the sake of illustration, the process Z is illustrated as the final process, the final inspection is illustrated as being performed by the inspection and delivery process 55*z*, and the product 53 is illustrated as being transported to a storage location. However, the number of processes from A to Z is not limited to 26 and, provided that a plurality of processes is provided, any number of processes may be used.

Next, the configuration of the plan generation apparatus 100 according to the present embodiment will be described while referencing FIG. 2.

In the present embodiment, the plan generation apparatus 100 is a computer. The plan generation apparatus 100 includes hardware such as a processor 901, a storage device 902, an input interface 903, and a communication device 910.

The plan generation apparatus 100 also includes, as functional constituents, a quality information acquisition unit 110, a correlation determination unit 120, a set determination unit 130, a process plan generation unit 140, and a storage unit 160. In the following description, the functions of the quality information acquisition unit 110, the correlation determination unit 120, the set determination unit 130, and the process plan generation unit 140 of the plan generation apparatus 100 are referred to as the functions of "units" of the plan generation apparatus 100. The functions of the "units" of the plan generation apparatus 100 are realized by software.

Additionally, the storage unit 160 is realized by the storage device 902. Quality information 210, correlation coefficient information 161, combination information 162, and a quality standard value BQ164 are stored in the storage unit 160. Note that the quality standard value BQ may be included in the quality information 210.

The processor 901 is connected to the other hardware via signal lines, and controls the other hardware.

The processor 901 is an integrated circuit (IC) that carries out processing. Specifically, the processor 901 is a central processing unit (CPU).

The storage device 902 includes an auxiliary storage device and memory. Specific examples of the auxiliary storage device include read only memory (ROM), flash memory, and a hard disk drive (HDD). Specific examples of the memory include random access memory (RAM). The storage unit 160 is realized by the storage device 902. The storage unit 160 specifically is realized by the memory, but a configuration is possible in which the storage unit 160 is realized by both the auxiliary storage device and the memory.

The communication device 910 includes a receiver 911 and a transmitter 912. Specifically, the communication device 910 is a communication chip or a network interface card (NIC). The communication device 910 functions as a communicator to transmit data. The receiver 911 functions as a receiver to receive data, and the transmitter 912 functions as a transmitter to send data.

The input interface 903 is a port to which an input device such as a mouse, a keyboard, or a touch panel connects. Specifically, the input interface 903 is a universal serial bus (USB) terminal. Additionally, a configuration is possible in which the input interface 903 is a port to which a local area network (LAN) connects.

The plan generation apparatus 100 may also be provided with an output interface. In such a case, the output interface is a port to which a cable of an output device such as a display connects. Examples of the output interface include a USB terminal and a high definition multimedia interface (HDMI, registered trademark) terminal. The display is specifically a liquid crystal display (LCD).

A program that realizes the functions of the "units" is stored in the auxiliary storage device. This program is loaded in the memory, read by the processor 901, and executed by the processor 901. An operating system (OS) is also stored in the auxiliary storage device. At least a portion of the OS is loaded in the memory, and the processor 901 executes the program to realize the functions of the "units" while running the OS.

The plan generation apparatus 100 may include one processor 901 or may include a plurality of processors 901.

The plurality of processors 901 may cooperate to execute the program to realize the functions of the "units."

Information, data, signal values, and variable values that indicate the results of the processing of the "units" are stored in the auxiliary storage device, the memory, or in a resistor or cache memory in the processor 901.

The program that realizes the functions of the "units" may be stored on a portable recording medium such as a magnetic disk, a floppy disk, an optical disk, a compact disk, a Blu-ray (registered trademark) disk, or a digital versatile disc (DVD).

Note that a process plan generation program 520 that realizes the functions of the "units" is the program that realizes the functions described as "units" of the plan generation apparatus 100. Additionally, the object referred to as a process plan generation program product is the storage medium and storage device on which the program that realizes the functions described as "units" is stored, and regardless of form and appearance, is a object on which a computer readable program is loaded.

Next, the configuration of the quality information 210 according to the present embodiment will be described while referencing FIG. 3.

Figure 3:
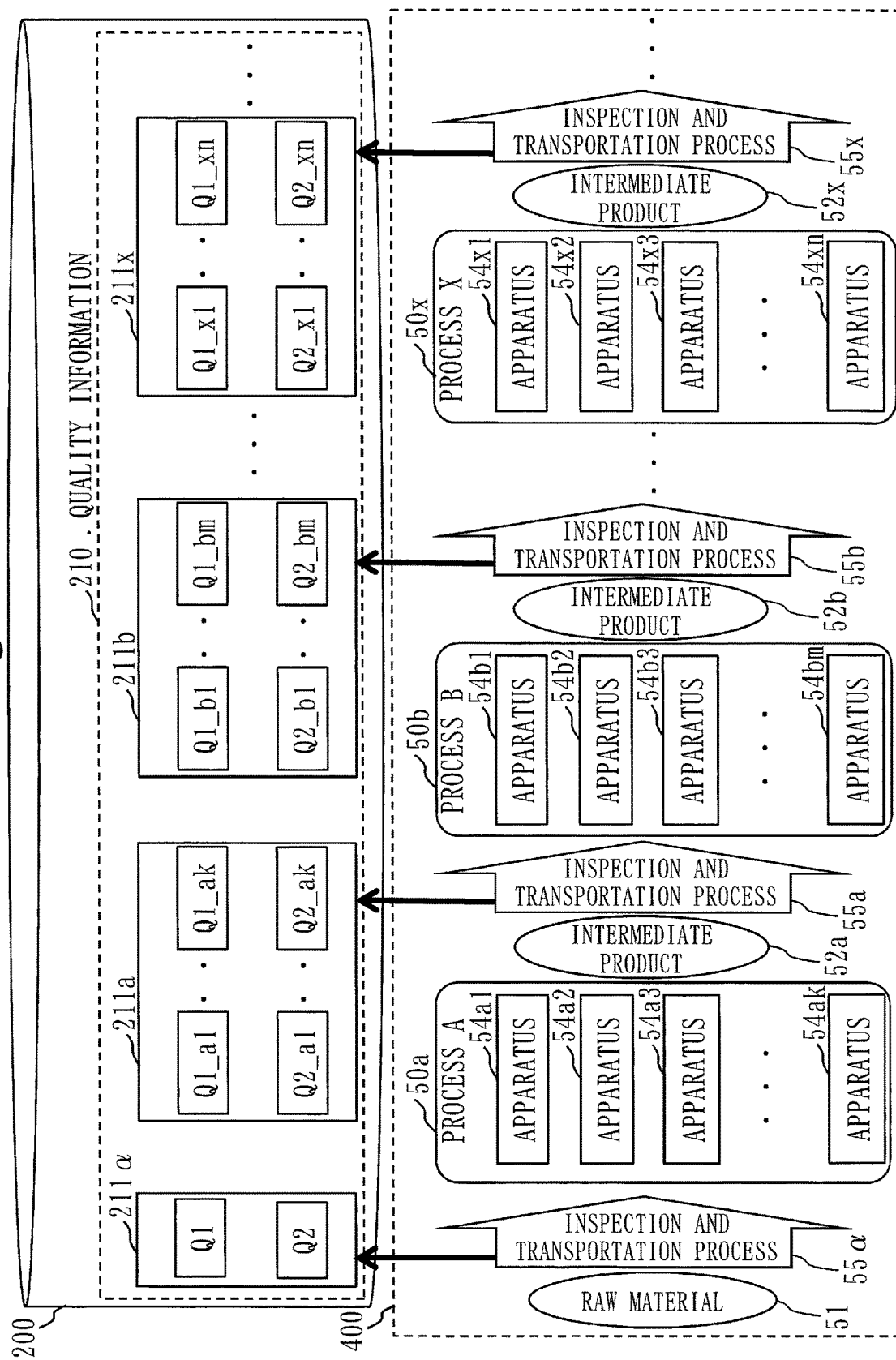
FIG. 3 is a drawing illustrating a configuration of quality information 210 according to the first embodiment.

As illustrated in FIG. 3, quality values indicating the quality of the intermediate product 52 processed by each apparatus 54 of each process 50 of the production facility 400 are stored in the quality information 210 of the database 200. FIG. 3 illustrates the process A, the process B, and a process X, which is between the process B and the final process Z. An apparatus 54$x$1 to an apparatus 54$xn$, where n is the number of apparatuses, belong to the process X.

The quality information 210 is saved in the database 200 and includes the quality values obtained in the inspection process following each process 50, and also includes distribution information of each quality value.

Quality information by process 211 is stored in the quality information 210. Specifically, quality information by process 211a of a previous process, quality information by process 211a of the process A, quality information by process 211b of the process B, ..., and quality information by process of the process X are saved in the quality information 210. Quality values for each apparatus 54 belonging to each process 50 are set in each piece of the quality information by process 211.

In the present embodiment, a quality value Q1 and a quality value Q2 are stored as the quality values. The quality value Q and the quality value Q2 are different types of quality values. In one specific example, the quality value Q1 is the size of the intermediate product 52 and the quality value Q2 is the number of scratches on the intermediate product 52. The quality values may be different types of quality indicator values as well.

Additionally, information related to the plurality of apparatuses 54 belonging to the corresponding process 50 is included in the quality information by process 211.

A quality value Q1α and a quality value Q2a are set in the quality information by process 211α in the stage prior to the process A. Inspection results from the stage prior to the process A, which is the first processing process, are saved in the quality information by process 211α. Typically, when the raw material 51 such as materials or parts is introduced to the production facility 400, each piece is inspected to confirm quality. As such, the quality information by process 211α from the stage prior to the process A is needed. The quality values of the quality information by process 211α are not affected by the apparatuses 54. When the raw material 51 is a part of a purchased item, the quality information by process 211α cannot be directly controlled by the production facility 400 and, therefore, in such cases, the raw material 51 is handled so as to distinguish it from other raw materials.

The quality value Q1 and the quality value Q2 are set in the quality information by process 211a of the process A for each apparatus belonging to the process A. Specifically, a quality value Q1_$a$1, a quality value Q1_$a$2, a quality value Q1_$a$3, ..., and a quality value Q1_$ak$ are set for the quality value Q1. A quality value Q2_$a$1, a quality value Q2_$a$2, a quality value Q2_$a$3, ..., and a quality value Q2_$ak$ are set for the quality value Q2. For example, the quality value Q1_$a$2 represents the quality value Q1 of the intermediate product 52$a$ processed by the apparatus 54$a$2.

The quality information by process 211b of the process B and the quality information by process 211$x$ of the process X have the same configuration as that of the quality information by process 211a described above.

That is, a quality value Q1_$b$1, a quality value Q1_$b$2, a quality value Q1_$b$3, ..., and a quality value Q1_$bm$ are set in the quality information by process 211b of the process B. Additionally, a quality value Q2_$b$1, a quality value Q2$b$2, a quality value Q2_$b$3, ..., and a quality value Q2_$bm$ are set. Moreover, a quality value Q1_$x$1, a quality value Q1_$x$2, a quality value Q1_$x$3, ..., and a quality value Q1_$xn$ are set in the quality information by process 211$x$ of the process X. Furthermore, a quality value Q2_$x$1, a quality value Q2_$x$2, a quality value Q2_$x$3, ..., and a quality value Q2_$xn$ are set.

Note that, since the intermediate products 52 that fail in the inspection processes are not passed to the next process, the quality information 210 only includes the quality values for the intermediate products 52 that pass the inspections, and does not include the quality values for the intermediate products 52 that fail.

*Description of Operations*

Figure 4:
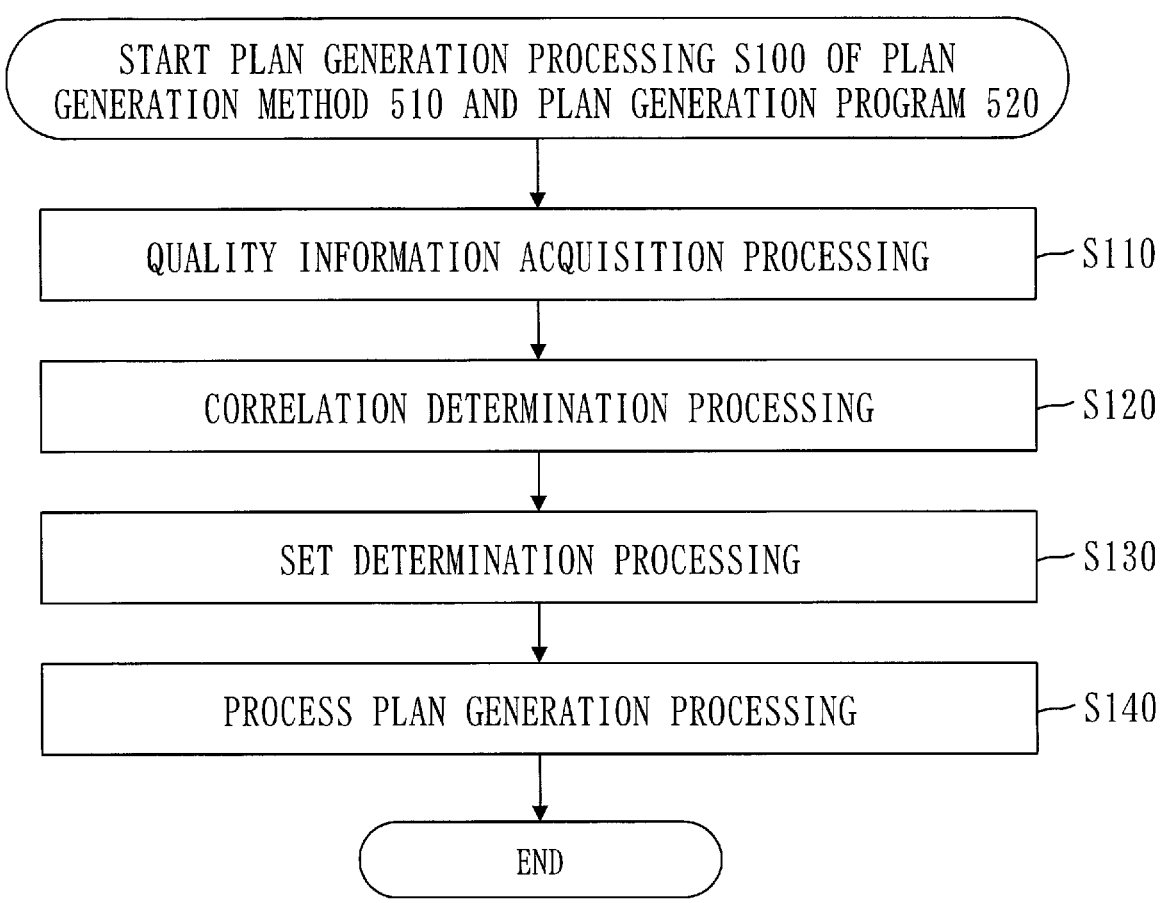
FIG. 4 is a flowchart illustrating a plan generation method 510 of the plan generation apparatus 100 and plan generation processing S100 of a plan generation program 520 according to the first embodiment.

Next, a plan generation method 510 of the plan generation apparatus 100 and plan generation processing S100 of the plan generation program 520 according to the first embodiment will be described while referencing FIG. 4.

In quality information acquisition processing S110, the quality information acquisition unit 110 uses the receiver 911 to receive the quality information 210 from the database 200. The quality information acquisition unit 110 stores the received quality information 210 in the storage unit 160 of the storage device 902. The configuration of the quality information 210 is as discussed with reference to FIG. 3.

In correlation determination processing S120, the correlation determination unit 120 sets, as a first apparatus T154, one apparatus among the plurality of apparatuses 54 of the production facility 400, and sets, as a first quality value T1Q, a quality value indicating the quality of the intermediate product 52 processed by the first apparatus T154. Moreover, the correlation determination unit 120 sets, as a second apparatus T254, an apparatus among the plurality of apparatuses 54 that belongs to the process 50 prior to the process 50 to which the first apparatus T154 belongs, and sets, as a second quality value T2Q, a quality value of the intermediate product 52 processed by the second apparatus T254. Additionally, the correlation determination unit 120 determines whether correlation exists between the first quality value T1Q and the second quality value T2Q.

Figure 5:
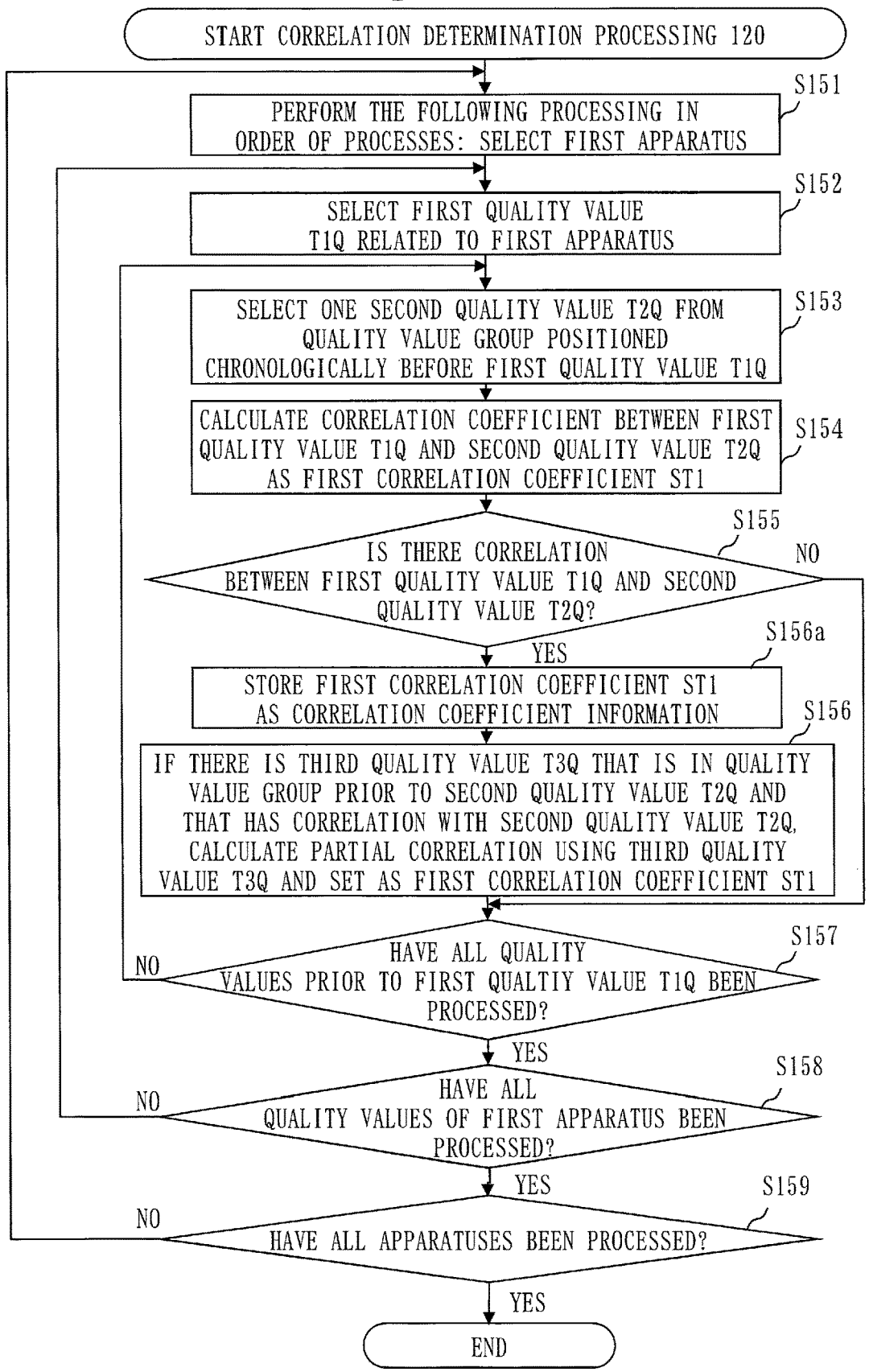
FIG. 5 is a flowchart illustrating correlation determination processing S120 of a correlation determination unit 120 according to the first embodiment.

Next, the correlation determination processing S120 of the correlation determination unit 120 according to the present embodiment will be described while referencing FIG. 5.

In step S151, the correlation determination unit 120 carries out the following processing for each process. First, the correlation determination unit 120 selects one process 50, and selects, as the first apparatus T154, one apparatus 54 of the plurality of apparatuses 54 belonging to the selected process 50. The first apparatus T154 is the apparatus that will be processed. Specifically, the correlation determination unit 120 acquires the quality information by process 211 of the selected process 50 from the quality information 210 stored in the storage unit 160, and selects the first apparatus T154 on the basis of information related to the plurality of apparatuses 54 belonging to the process 50 included in the quality information by process 211.

In step S152, the correlation determination unit 120 acquires, as the first quality value T1Q, the quality value of the intermediate product 52 processed by the first apparatus T154 from the quality information 210 stored in the storage unit 160. The first quality value T1Q is the quality value that will be processed. Specifically, the correlation determination unit 120 selects, as the first quality value T1Q, one quality value corresponding to the first apparatus T154 included in the quality information by process 211 of the quality information 210.

In a specific example, the correlation determination unit 120 sets an apparatus 54x2 of the process X as the first apparatus T154, and sets the quality value Q1_x2 as the first quality value T1Q.

In step S153, the correlation determination unit 120 sets, as the second apparatus T254, an apparatus among the plurality of apparatuses 54 that belongs to the process prior to the process to which the first apparatus T154 belongs, and sets, as the second quality value T2Q, a quality value of the intermediate product 52 processed by the second apparatus T254. Specifically, the correlation determination unit 120 sequentially acquires the quality information by process 211 of the process prior to the process X from the quality information 210 stored in the storage unit 160, and sequentially acquires, as the second apparatus T254, the apparatus 54 included in the acquired quality information by process 211. Additionally, the correlation determination unit 120 sequentially acquires, as the second quality value T2Q, the quality value of the acquired second apparatus T254.

In a specific example, the correlation determination unit 120 sets the apparatus 54b2 of the process B as the second apparatus T254, and sets the quality value Q2_b2 as the second quality value T2Q.

In step S154, the correlation determination unit 120 calculates, as a first correlation coefficient ST1, a correlation coefficient between the first quality value T1Q and the second quality value T2Q.

In step S155, the correlation determination unit 120 determines whether correlation exists between the first quality value T1Q and the second quality value T2Q. The correlation determination unit 120 uses the first correlation coefficient ST1 to determine whether correlation exists between the first quality value T1Q and the second quality value T2Q.

In a specific example, the correlation determination unit 120 calculates, as the first correlation coefficient ST1, the correlation between the quality value Q1_x2, which is the first quality value T1Q and the quality value Q2_b2, which is the second quality value T2Q. Here, the correlation determination unit 120 confirms, on the basis of a preset significance standard, whether a significant difference exists as to whether correlation exists, and determines that there is no significant difference and that correlation does not exist when a p value does not satisfy the significance standard. Specifically, the significance standard is 5%. For example, the correlation determination unit 120 determines that correlation does not exist between the first quality value T1Q and the second quality value T2Q when the p value is 5% or less and the correlation coefficient is less than 0.2.

When it is determined in step S155 that correlation exists between the first quality value T1Q and the second quality value T2Q, step S156a is executed.

In step S156a, the correlation determination unit 120 stores, as the correlation coefficient information 161, the first correlation coefficient ST1 between the first quality value T1Q and the second quality value T2Q in the storage unit 160.

When it is determined in step S155 that correlation does not exist between the first quality value T1Q and the second quality value T2Q, step S157 is executed.

In step S156, in cases where there is a third quality value T3Q that has correlation with the second quality value T2Q in a quality value group located chronologically before the second quality value T2Q, the correlation determination unit 120 uses the third quality value T3Q to calculate a partial correlation coefficient, and sets the partial correlation coefficient as the first correlation coefficient ST1. Specifically, the correlation determination unit 120 uses the correlation coefficient information 161 stored in the storage unit 160 to detect, as a third apparatus T354, an apparatus, from among the apparatuses belonging to the process prior to the process to which the second apparatus T254 belongs, that has correlation with the second apparatus T254 and also correlation with the first apparatus T154. Then, the correlation determination unit 120 sets the quality value of the third apparatus T354 as the third quality value T3Q, and calculates the partial correlation coefficient between the first quality value T1Q and the second quality value T2Q on the basis of a second correlation coefficient ST2, which is a correlation coefficient between the third quality value T3Q and the second quality value T2Q, and a third correlation coefficient ST3, which is a correlation coefficient between the third quality value T3Q and the first quality value T1Q. The correlation determination unit 120 determines whether correlation exists between the first quality value T1Q and the second quality value T2Q on the basis of the calculated partial correlation coefficient. When it is determined that correlation exists between the first quality value T1Q and the second quality value T2Q, the correlation determination unit 120 replaces the first correlation coefficient ST1 in the correlation coefficient information 161 with the calculated partial correlation coefficient.

In step S157, the correlation determination unit 120 determines whether all of the quality values prior to the first quality value T1Q have been processed. When there is a quality value that has not been processed, step S153 is executed and the quality value that has not been processed is selected as the second quality value T2Q. When there are no quality values that have not been processed, step S158 is executed.

In step S158, the correlation determination unit 120 determines whether all of the quality values of the first apparatus T154 have been processed as the first quality value T1Q. When there is a quality value that has not been processed, step S152 is executed and the quality value that has not been processed is selected as the first quality value T1Q. When there are no quality values that have not been processed, step S159 is executed.

In step S159, the correlation determination unit 120 determines whether all of the plurality of apparatuses 54 included in the production facility 400 have been processed as the first apparatus T154. When there is an apparatus that has not been processed, step S151 is executed and the apparatus that has not been processed is selected as the first apparatus T154. When there are no apparatuses that have not been processed, the processing is ended.

In the description given above, for all of the quality values associated with all of the apparatuses, the correlation determination unit 120 calculated all of the quality values and correlation coefficients chronologically before the quality value to be processed.

Next, the correlation coefficient information 161 generated by the correlation determination processing S120 according to the present embodiment will be described while referencing FIG. 6. FIG. 6 illustrates the correlation coefficient information 161 that depicts the correlation coefficients for the quality value Q1_$x$3 and the quality value Q2_$x$3 of an apparatus 54$x$3, which is a machine No. X3 of the process X.

In the following, processing will be described by using the quality value Q1_$x$3 of the quality information by process 211$x$ of the process X as an example. A quality value group having correlation with the quality value Q1_$x$3 can be extracted by calculating correlation coefficients using the correlation determination processing S120 described above.

By executing the correlation determination processing S120, the correlation determination unit 120 extracts, from the quality information 210, quality values that are chronologically before the quality value Q1_$x$3 and that have correlation with the quality value Q1_$x$3, associates the quality values with correlation coefficients, and stores the quality values in the correlation coefficient information 161.

In FIG. 6, the quality values are arranged in descending chronological order and the correlation coefficients are set so that the correlation coefficients coincide therewith, but the correlation coefficient information 161 may be arranged in descending order of the correlation coefficients.

In the correlation coefficient information 161, quality values for which the p value is 5% or less, no significant difference exists, and the correlation coefficient is less than 0.2 can be regarded as not having correlation. Here, unless there is a special reason specific to the process or the product to be produced, the typical values described above are used as thresholds to determine correlation. Since there is no need to make special consideration for quality values without correlation when generating the process plan, such quality values are not stored in the correlation coefficient information 161.

The correlation coefficient information 161 of FIG. 6 depicts the values of correlation coefficients for a case in which the apparatus 54$x$3 of the process X is set as the first apparatus T154, and the quality value Q1_$x$3 is set as the first quality value T1Q. The quality values depicted in this correlation coefficient information 161 are a list of the quality values of the process prior to the process X. In the correlation determination processing S120 described above, the correlation determination unit 120 only set, in the correlation coefficient information 161, the quality values that were determined to have correlation with the first quality value T1Q of the first apparatus T154. However, the correlation determination unit 120 may set, in the correlation coefficient information 161, all of the quality values for which correlation coefficients with the first quality value T1Q were calculated. In this case, the correlation determination unit 120 determines the quality values that have correlation with the first quality value T1Q (for example, the quality value Q1_$x$3) from among the quality values set in the correlation coefficient information 161.

In FIG. 6, an example is illustrated in which all of the quality values, for which correlation coefficients with the quality value Q1_$x$3 of the apparatus 54$x$3 were calculated, are set in the correlation coefficient information 161.

Figure 7:
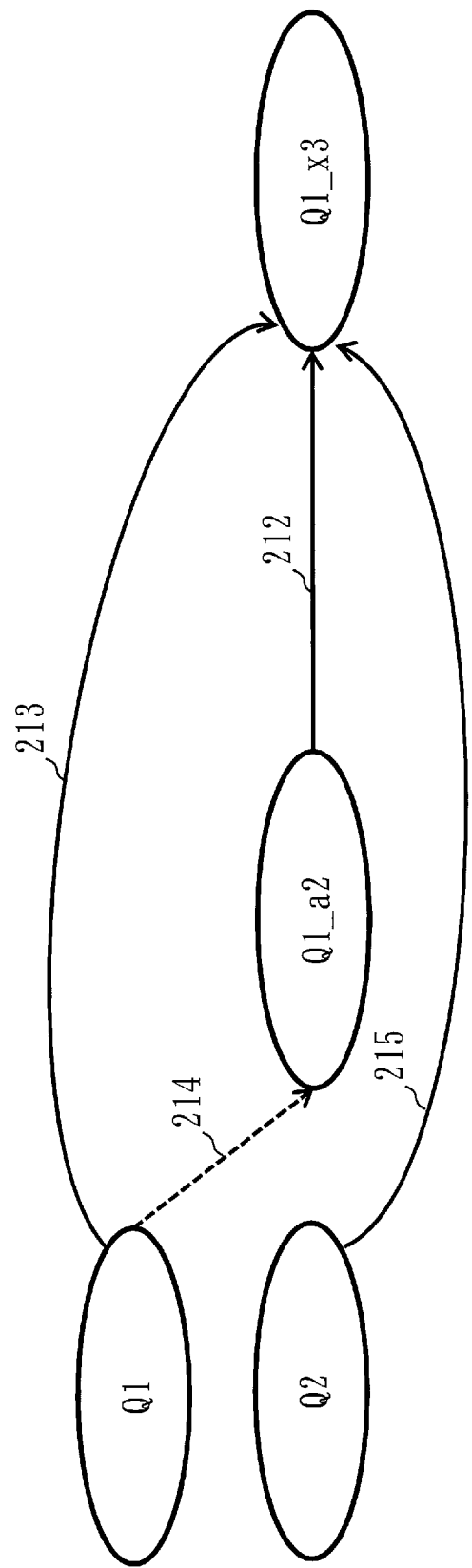
FIG. 7 is a quality value association diagram for a quality value $Q1\_x3$ of an apparatus $54x3$ according to the first embodiment.

Next, an example of an association diagram for the quality value Q1_$x$3 of the apparatus 54$x$3 according to the first embodiment will be described while referencing FIG. 7. FIG. 7 illustrates a quality value association diagram for a case in which it is determined that, when the correlation coefficient for the quality value Q1_$x$3 is calculated, correlation exists for Q1, Q2, and Q1_$a$2, but correlation does not exist for the other quality values. Links 212, 213, and 215, indicated by arrows, indicate combinations with correlation. Note that a link 214 is also depicted in FIG. 7, and this link 214 indicates that correlation exists between Q1 and Q1_$a$2. In such a case, the correlation coefficient calculated for the link 212 of Q1_$a$2 to Q1_$x$3 is a value that includes the influence of Q1. As such, a partial correlation coefficient from which this influence is excluded must be calculated. Therefore, in step S156 of the correlation determination processing S120, a first correlation coefficient is calculated that considers the correlations between the quality values included in the process prior to the process currently being calculated.

Typically, when determining correlation coefficients of variables by calculating the correlation coefficients, it is unclear which indicates a cause and which indicates a result. However, in the present embodiment, when calculating the quality value of the process X, a method is employed in which the correlation coefficient is calculated for the quality values of the process prior to the process X. As a result, the input values when calculating the correlation coefficients are all quality values inspected chronologically before the process X. This configuration inevitably clarifies the causal relationship. However, calculations such that correlation exists are possible even in cases where, as a result due other factors that are not measured, correlation exists between a quality value of the process X and a certain quality value prior to the process X. As such, it is preferable that quality values are selected for factors that influence inspection results. Actually, it is acceptable to assume that factors that influence the detection results significantly are frequently confirmation subjects in the inspection process of the previous process. Due to this, in cases where the production line branches, the correlation coefficients must be calculated by selecting only the processes to which the intermediate product is to be provided as the processes for which correlation coefficients are to be calculated. This is because branched processes do not influence that process until the production line merges together again.

Next, set determination processing S130 of FIG. 4 will be described.

In the set determination processing S130, the set determination unit 130 uses the correlation coefficient information 161 stored in the storage unit 160 to execute processing.

The set determination processing S130 is executed when it is determined that correlation exists between the first quality value T1Q and the second quality value T2Q. Specifically, the set determination unit 130 uses the correlation coefficient information 161, which is information of the quality values determined to have correlation, to execute the set determination processing S130. The set determination processing S130 is processing in which the correlation coefficient information 161 generated by the correlation determination unit 120 is used to extract a list of sets of apparatuses 540 to be statically combined to the greatest extent possible from among the plurality of apparatuses 54, and the sets of apparatuses 540 are stored in the combination information 162. Using the extracted sets of apparatuses 540 makes it possible to reduce the influence caused by variation of the quality values. Note that, as described above, the quality values that have correlation with other quality values, among the quality values associated with each of the apparatuses 54 included in the production line, are stored in the correlation coefficient information 161.

The set determination unit 130 uses the quality standard value BQ representing a standard of quality of the intermediate product 52 to determine whether the first apparatus T154 and the second apparatus T254 are the set of apparatuses 540. An error between the first quality value T1Q and the quality standard value BQ is defined as a first error 31. An error between the second quality value T2Q and the quality standard value is defined as a second error 32. Errors between the quality values and the quality standard value BQ are also referred to as quality value variations.

Being the set of apparatuses 540 means that the first error 31 between the first quality value T1Q and the quality standard value BQ and the second error 32 between the second quality value T2Q and the quality standard value cancel each other out.

Figure 8:
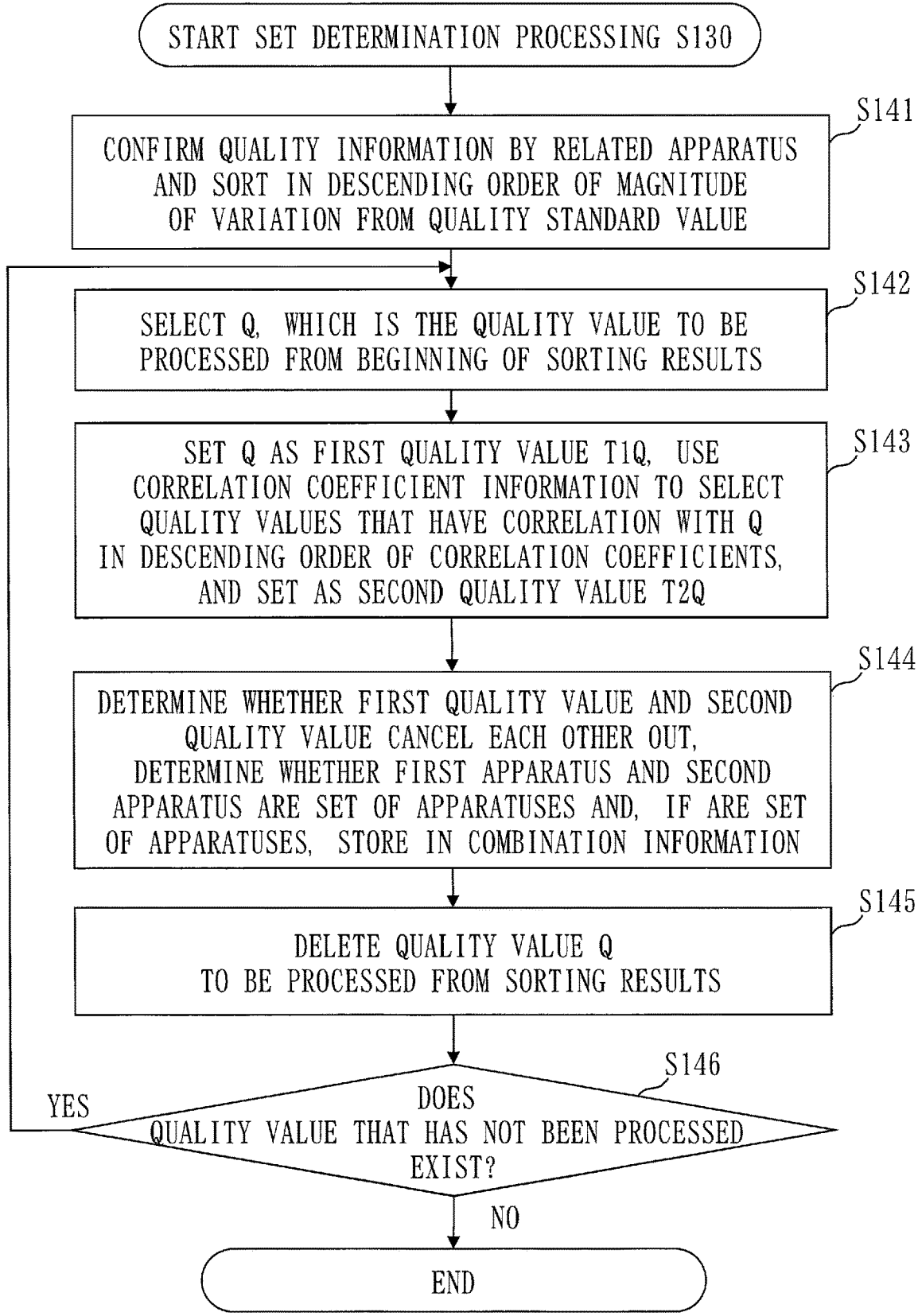
FIG. 8 is a flowchart illustrating set determination processing S130 of a set determination unit 130 according to the first embodiment.

Next, the set determination processing S130 of the set determination unit 130 according to the present embodiment will be described while referencing FIG. 8.

In step S141, the set determination unit 130 carries out sorting processing in descending order of the magnitude of variation from the quality standard value BQ for the quality values included in the quality information 210. Specifically, the set determination unit 130 calculates an average value for each quality value, with a preset number of times of execution history or production performance information of the intermediate product 52 produced in a preset period for each of the quality values as an input. The set determination unit 130 calculates the variation from the quality standard value BQ by calculating the difference between the calculated average value and the corresponding quality standard value BQ. The set determination unit 130 sorts the quality values in descending order of the absolute values of the variations calculated in accordance with the procedure described above.

In step S142, the set determination unit 130 proceeds with the processing from the beginning of the sorting results of the quality values. The quality value stored at the beginning of the sorting results is the quality value for the apparatus for which the absolute value of variation from the quality standard value BQ is the greatest. The set determination unit 130 selects, as Q, the quality value to be processed from the beginning of the sorting results. The corresponding apparatus is uniquely determined for Q. In the following, the set determination unit 130 determines the set of apparatuses 540 for Q, and sets the set of apparatuses 540 in the combination information 162 of the storage unit 160. At this point, the combination information 162 is empty.

In step S143, the set determination unit 130 sets Q as the first quality value T1Q, and uses the correlation coefficient information 161 to select the quality values that have correlation with the first quality value T1Q in descending order of the correlation coefficients. The set determination unit 130 sets the selected quality values as the second quality value T2Q.

In step S144, the set determination unit 130 determines whether the first apparatus T154 corresponding to the first quality value T1Q and the second apparatus T254 corresponding to the second quality value T2Q are the set of apparatuses 540 in which the variations of the first quality value T1Q and the second quality value T2Q cancel each other out.

Specifically, the set determination unit 130 determines that the first apparatus T154 and the second apparatus T254 are the set of apparatuses 540 when a negative correlation exists between the first quality value T1Q and the second quality value T2Q and, also, the positives/negatives of the first error 31 and the second error 32 are identical. The set determination unit 130 stores this set of apparatuses 540 in the combination information 162 of the storage unit 160. Additionally, the set determination unit 130 determines that the first apparatus T154 and the second apparatus T254 are the set of apparatuses 540 when a positive correlation exists between the first quality value T1Q and the second quality value T2Q and, also, the positives/negatives of the first error 31 and the second error 32 are different. The set determination unit 130 stores this set of apparatuses 540 in the combination information 162 of the storage unit 160.

Note that, cases in which the positives/negatives of the first error 31 and the second error 32 are identical are cases where the first error 31 is a positive number and, also, the second error 32 is a positive number; or cases where the first error 31 is a negative number and, also, the second error 32 is a negative number. Cases in which the positives/negatives of the first error 31 and the second error 32 are different are cases where the first error 31 is a negative number and the second error 32 is a positive number; or cases where the first error 31 is a positive number and the second error 32 is a negative number.

In steps S142 to S144, the set determination unit 130 proceeds with subsequent processing in order from the quality value that has the strongest correlation (specifically, correlation coefficient >0.7) with Q. The set determination unit 130 starts a search of the quality values from the beginning of the sorting results, which are the output of step S141, and selects the quality values with inverse correlation and variation in the same direction (+−), or quality values with positive correlation and variation in opposite directions (+−). The set determination unit 130 adds the sets of apparatuses 540 corresponding to the selected quality values to the combination information 162. By sequentially confirming from the beginning of the sorting results of the quality values, apparatuses for which the absolute value of variation is large can be selected first from among the plurality of apparatuses belonging to the same process. Thus, the sets of apparatuses 540 are stored in the combination information 162 in order of capability of the sets of apparatuses 540 to eliminate greater variations. Accordingly, the sets of apparatuses 540 stored in the combination information 162 are stored in order of priority of the sets of apparatuses 540.

In step S145, the set determination unit 130 deletes the quality values selected in step S142 from the sorting results of the quality values. This is to prevent the same quality values from being selected multiple times as Q.

In step S146, the set determination unit 130 determines whether a quality value that has not been processed exists in the quality information 210 and, when there are no quality values that have not been processed, ends the processing. When it is determined that there is a quality value that has not been processed, the set determination unit 130 executes step S142. When the processing is ended for all of the quality values included in the sorting results of the quality values, the combination information 162 is obtained that includes the sets of apparatuses 540 that should be statically assigned.

A description of the set determination processing S130 has been given.

Next, process plan generation processing S140 of FIG. 4 will be described.

In the process plan generation processing S140, the process plan generation unit 140 uses the set of apparatuses 540 to generate a process plan when it is determined that the first apparatus T154 and the second apparatus T254 are the set of apparatuses 540 that should be combined. Specifically, the process plan generation unit 140 uses the combination information 162 generated by the set determination unit 130 to determine an apparatus path determined as optimal from the standpoint of quality, and generates the process plan 151.

In the process plan generation processing S140, the process plan generation unit 140 carries out the following processing.

The process plan generation unit 140 acquires the combination information 162 from the storage unit 160. Additionally, the process plan generation unit 140 acquires the production plan information 300 input via the input device. The sets of apparatuses 540 that should be statically set as paths of apparatuses are stored in order of priority in the combination information 162. The process plan generation unit 140 generates the process plan 151 on the basis of the production plan information 300 and the sets of apparatuses 540 stored in the combination information 162.

Specifically, first, the process plan generation unit 140 creates an apparatus path draft on the basis of only the production plan information 300, without using the combination information 162.

Then, the process plan generation unit 140 generates an apparatus path from the apparatus path draft, with the list of the sets of apparatuses 540 that are stored in the combination information 162 in order of priority as the input. The process plan generation unit 140 assigns production instructions, that is, the process plan 151, from the sets of apparatuses 540 for which priority is high, with the apparatus path draft that includes the set of apparatuses 540 as the apparatus path. In cases where using the same production facility 400 by first specifying the apparatus path including the set of apparatuses 540 for which priority is high, it is possible to create a process plan 151 whereby higher product quality can be expected.

In the process plan generation processing S140, the generated process plan 151 may be checked to determine whether estimation results of the pre-calculated final quality will be met.

Next, a method in which the process plan generation unit 140 statistically estimates the final quality of the product 53 will be described.

The process plan generation unit 140 uses the quality information 210 to carry out multiple regression analysis with the quality value of the final quality as an objective variable and other quality values included in the production line as explanatory variables, and calculates the final quality. Here, the regression coefficient will not be calculated correctly when there is strong correlation between the quality values serving as the explanatory variables. Thus, the process plan generation unit 140 uses the correlation coefficient information 161 to omit quality values with strong correlation (specifically, quality values for which the absolute value of the correlation coefficient is 0.7 or greater) from the explanatory variables prior to carrying out the multiple regression analysis. As a result of this processing, the quality value of the final product is calculated without the influence of correlation noise. Additionally, when predicting the quality value of the final product or other values using multiple regression analysis, the explanatory variables need not only be the quality values inspected in the inspection processes carried out after each process, but may also include production conditions including values such as the setting values of each of the apparatuses. However, when increasing the number of explanatory variables, checks must be performed to ensure that strong correlation does not exist with the selected other explanatory variables.

Depending on the usage situation of the production facility 400, it is possible to select whether to use the previous one-month or to use a longer period as the quality information 210 used in the plan generation processing S100. Additionally, situations are possible in which the intermediate product to be produced is changed by a plan change operation, even if the production facilities are the same. When producing different intermediate products or products with the same production apparatuses, it is typical to treat these different intermediate products or products differently, even if the inspection processes are identical. However, when implementing further plan changes to produce the original intermediate product, a situation is possible in which the distribution of the quality indicator value will differ from the previous distribution due to the plan changing operation itself in cases where the plan changing operation involves physically replacing a portion of the production apparatuses. In such cases, independent data collection may be carried out for each plan change, even for production apparatuses that produce the same intermediate products, and the data used when calculating the distribution may be handled differently. Additionally, there are cases in which, for parts to be supplied, the quality values differ by lot. As with the measures for plan changing operations, measures may be added to handle the data used when calculating the distribution differently when the lots differ. In cases where the distribution of the quality values is not influenced by the presence/absence of plan changes or differences in lots and that there are no apparent changes from previous distributions, it can be determined that any changes are dependent on the apparatuses. However, in cases where the distribution of the quality values seems to be influenced, it is possible to take measures such as using correlation coefficients or distributions calculated using only data of the same line.

*Other Configurations*

In the present embodiment, the database 200 is provided outside the plan generation apparatus 100, but a configuration is possible in which the database 200 is provided inside the plan generation apparatus 100. Specifically, the inspection processes of the production facility 400 may be configured such that the quality information 210 is directly set in the database 200 inside the plan generation apparatus 100.

In the present embodiment, the functions of the plan generation apparatus 100 are realized by software, but a modification example is possible in which the functions of the plan generation apparatus 100 are realized by hardware.

A configuration of the plan generation apparatus 100 according to this modification example of the present embodiment will be described while referencing FIG. 9.

Figure 9:
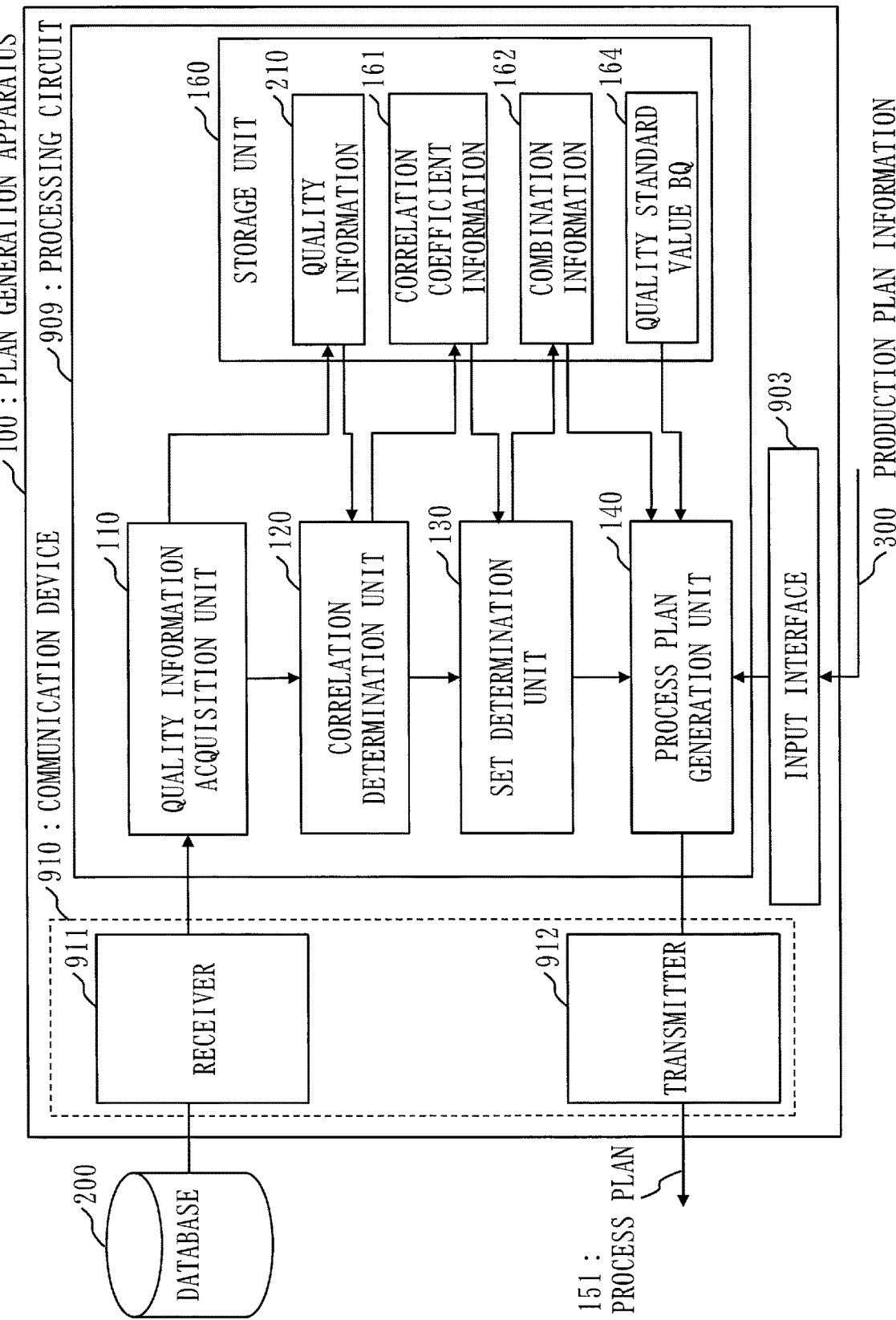
FIG. 9 is a drawing illustrating a configuration of the plan generation apparatus 100 according to a modification example of the first embodiment.

As illustrated in FIG. 9, the plan generation apparatus 100 includes hardware such as a processing circuit 909, the communication device 910, and the input interface 903.

The processing circuit 909 is a dedicated electronic circuit to realize the functions of the "units" described above and the storage unit 160. Specifically, the processing circuit 909 is a single circuit, a composite circuit, a programmed processor, a parallel programmed processor, a logic IC, a Gate Array (GA), an Application Specific Integrated Circuit (ASIC), or a Field-Programmable Gate Array (FPGA).

The functions of the "units" may be realized by a single processing circuit 909, or may be dispersed and realized over a plurality of processing circuits 909.

In another modification example, a configuration is possible in which the functions of the plan generation apparatus 100 are realized by a combination of software and hardware. That is, a configuration is possible in which a portion of the functions of the plan generation apparatus 100 is realized by dedicated hardware, and the remaining functions are realized by software.

Figure 2:
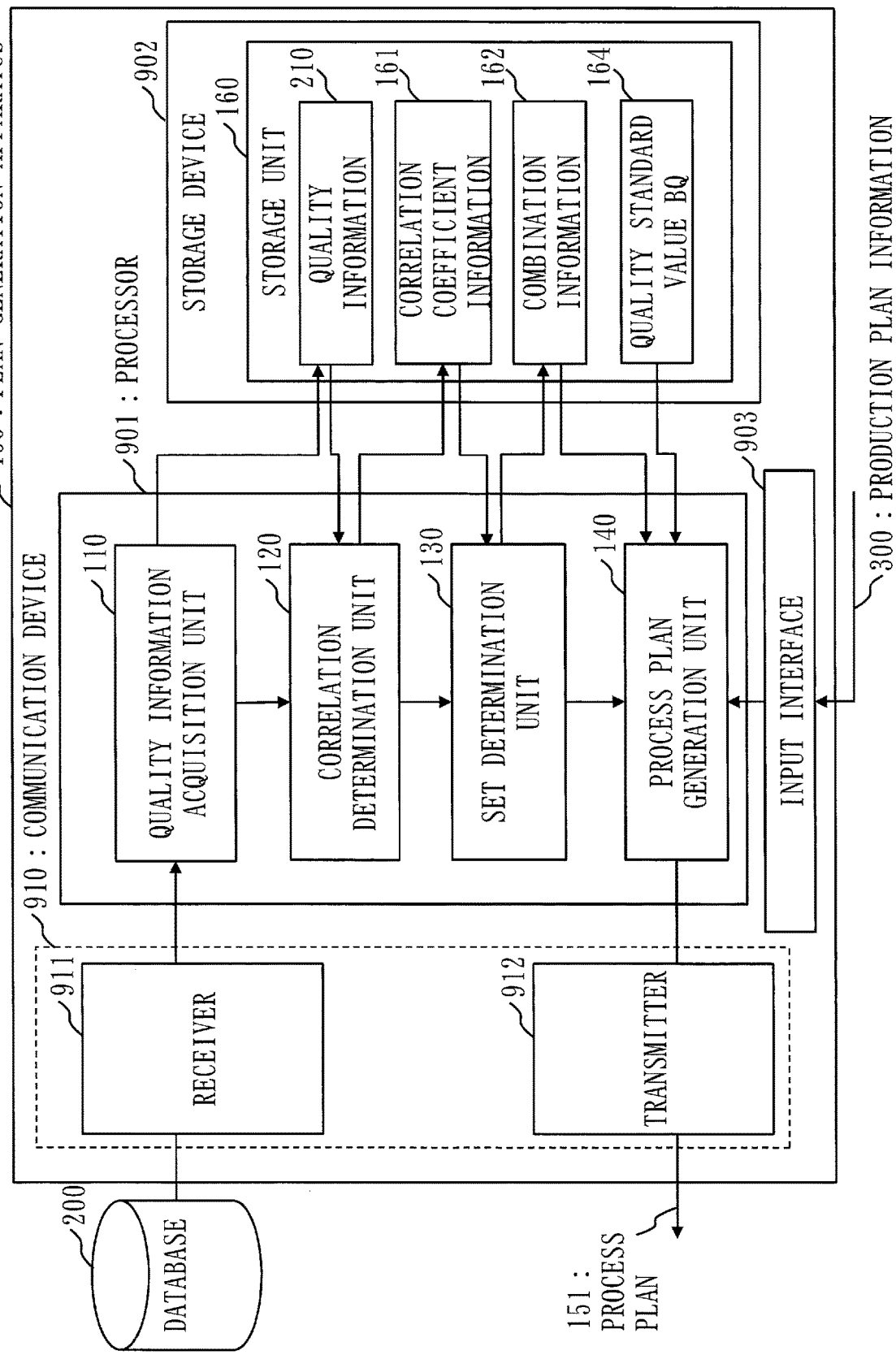
FIG. 2 is a drawing illustrating a configuration of the plan generation apparatus 100 according to the first embodiment.
Figure 10:
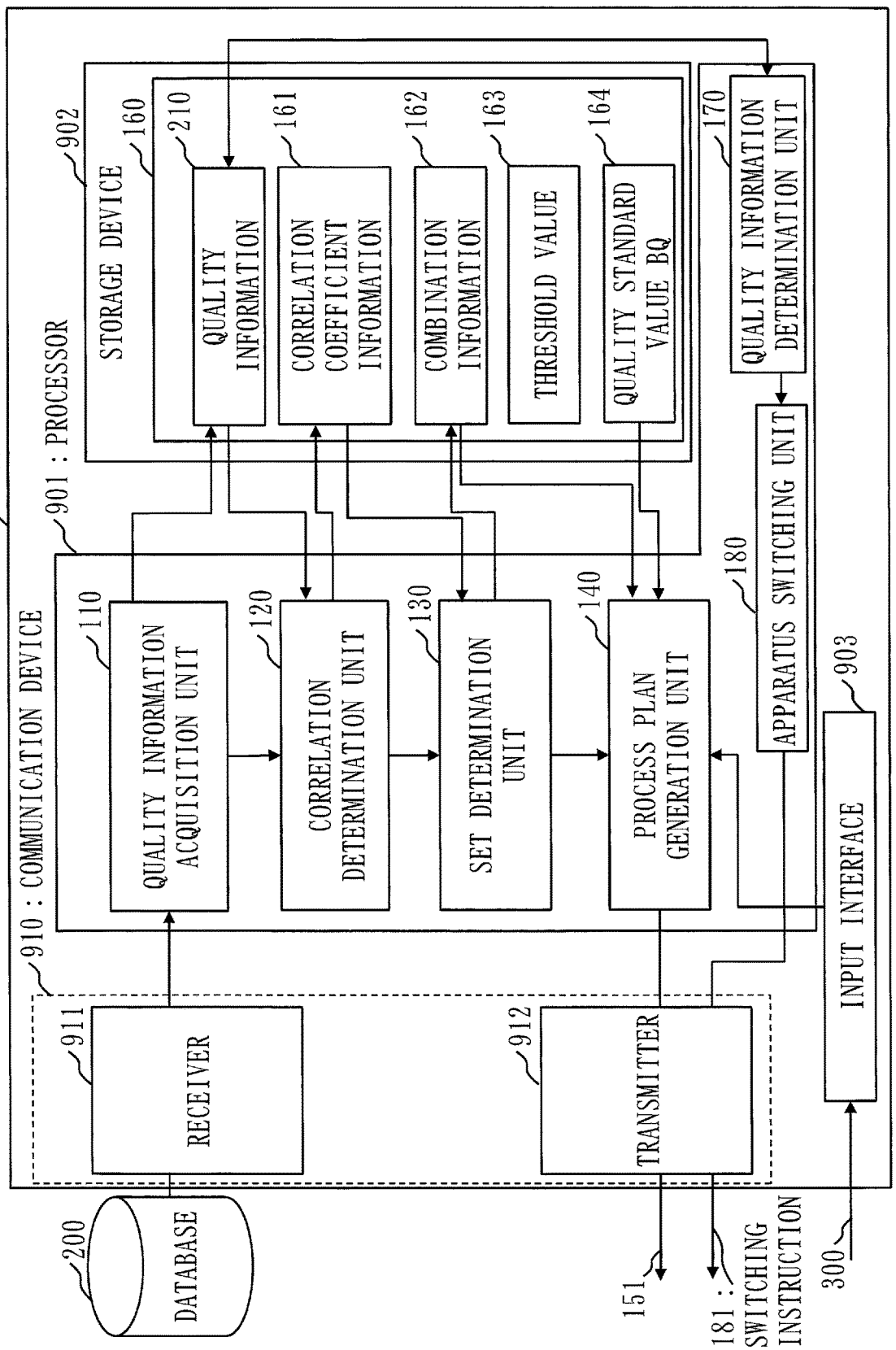
FIG. 10 is a drawing illustrating a configuration of a plan generation apparatus 100a according to a second embodiment.

The processor 901, the storage device 902, and the processing circuit 909 are collectively referred to as "processing circuitry." That is, regardless of whether the plan generation apparatus 100 has the configuration illustrated in FIG. 2 or FIG. 10, the functions of the "units" are realized by the processing circuitry.

The term "unit" may be interchanged with "process", "procedure" or "processing." Additionally, the functions of the "units" may be realized by firmware.

Description of Effects of the Embodiment

In the description of the present embodiment, a plan generation apparatus for presenting a process plan of a production line has been described. This plan generation apparatus includes a database in which quality information obtained via each individual apparatus of each process is stored when there are a plurality of apparatuses that are selectable for each process. The plan generation apparatus is provided with a correlation analysis function to acquire the quality information from the database and determine the production conditions, that is, the correlation of the quality indicator values, between the production apparatuses, and a quality distribution estimation function to determine, on the basis of correlation coefficient information, a combination whereby the variation of the production apparatuses is canceled out. Additionally, the plan generation apparatus is provided with a quality estimation function to estimate, from information provided by the functions described above, the quality of the product to be produced, and a production apparatus combination determination function to determine combinations of production apparatuses. Moreover, the plan generation apparatus is provided with a process plan determination function to determine, on the basis of the determined combination of production apparatuses, an apparatus path obtained via the plurality of apparatuses that are selectable by process, and to present the production plan.

With the plan generation apparatus according to the present embodiment, a function to recommend an apparatus path for which quality is statistically optimal when creating a process plan can be provided by extracting the correlation between the production apparatuses from the information of production facility tests, even in cases where information on the production apparatuses that have correlation does not exist.

With the plan generation apparatus according to the present embodiment, production instructions are assigned that take not only the quality of the intermediate products produced by each apparatus, but also the apparatus path into consideration. As a result, it is possible to create a process plan whereby the quality of the product to be produced increases, even when using the same production facilities. Typically, it is necessary to depend on the experience of a technician having sufficient knowledge of the quirks and tendencies of each apparatus in order to create such a process plan. In addition, when attempting to statistically determine a process plan, it is necessary to conduct tests in which the actual production instructions are issued to all of the apparatus paths, and production is carried out on those apparatus paths. The number of times these tests are performed must be sufficient to statistically analyze the quality indicator values measures obtained as the results of these tests. With the plan generation apparatus according to the present embodiment, it is possible to automatically calculate the correlation between the apparatuses and present an apparatus path having a set of apparatuses whereby the variations from the quality standard value of each of the apparatuses cancel each other out to the greatest extent possible, without depending on the experience and technical knowledge of a production site technician.

With the plan generation apparatus according to the present embodiment, a function to analyze the correlation from the quality indicator values obtained from each of the apparatuses is provided. As such, even when not using a previously executed apparatus path, it is possible to automatically determine the optimal apparatus path for any apparatus path by calculating the correlation between the apparatuses on the basis of the quality performance of each individual apparatus and considering the combinations of apparatuses having correlation.

In some cases, selection must be made such that strong correlation does not exist between the quality indicator values or the production conditions to be selected as the explanatory variables of the regression analysis to generate the process plan. That is, in some cases, it is necessary to understand the relationships between the plurality of quality indicator values or production conditions. With the plan generation apparatus according to the present embodiment, a function to analyze the correlation on the basis of the quality indicator values obtained from each apparatus is provided. As such, even in cases where there is no prior knowledge, expert knowledge, or experience, the explanatory variables of the regression analysis can be automatically selected and used as the determination criteria for the apparatus path.

Typically, an inspection process is set after each processing process, and the produced intermediate product is inspected as to whether the quality indicator value has been achieved as designed. Even when the variation in quality is within an acceptable range for each inspection, in cases where multiple produced intermediate products or parts are combined or combined and processed, the variation in the quality of each apparatus will compound, which may lead to increased variation in the quality of the final product. Moreover, in some cases, this increased variation may result in failure of the final inspection.

Obviously, the quality indicator values inspected in the inspection processes are not all independent, un-related values, but can be the one having the correlation. As such, when there are pluralities of apparatuses to realize the same processes, the combination of apparatuses to be used can be adjusted such that apparatuses are combined whereby the variations in the quality thereof cancel each other out, which enables a reduction in variations in quality. In a simple example of a case of combining objects for which the sizes of the parts to be combined are small and large, there is a possibility that the size of the combined intermediate product will not be the sum of the variation of each part but, rather, these variations will cancel each other out, resulting in smaller variation.

With the plan generation apparatus according to the present embodiment, such a phenomenon can be used to automatically extract a set of apparatuses that enables the reduction of the variations of the quality values, and the extracted set of apparatuses can be used to generate the process plan. As such, an optimal process plan can be generated in a short amount of time.

Additionally, combinations of apparatuses that are selectable by process are taken into consideration. Therefore, an apparatus can be provided to recommend an optimal combination of existing apparatus assets, whereby products of increased quality can be manufactured using the same apparatus assets.

Second Embodiment

In the present embodiment, differences from the first embodiment are primarily described.

In the present embodiment, the production facility can dynamically select an apparatus of a subsequent process when executing production. In the present embodiment, a plan generation apparatus 100a is described. The plan generation apparatus 100a is provided with functions to dynamically estimate, on the basis of a quality value inspected in a current inspection process, an apparatus for a subsequent process that has the highest possibility of resolving variation that has occurred, and automatically change to that estimated apparatus.

*Description of Configuration*

Next, the configuration of the plan generation apparatus 100a according to the present embodiment will be described while referencing FIG. 10.

In the present embodiment, constituents having the same functions as those described in the first embodiment are assigned the same reference numerals and, in some cases, description thereof is foregone.

In addition to the same functional configuration as the plan generation apparatus 100 described in the first embodiment, the plan generation apparatus 100a is provided with a quality information determination unit 170 and an apparatus switching unit 180. Additionally, in addition to the information described in the first embodiment as being stored in the storage unit 160, a threshold value 163 is stored in the storage unit 160. The functions of the quality information acquisition unit 110, the correlation determination unit 120, the set determination unit 130, the process plan generation unit 140, the quality information determination unit 170, and the apparatus switching unit 180 of the plan generation apparatus 100a are referred to as the functions of "units" of the plan generation apparatus 100a. The functions of the "units" of the plan generation apparatus 100a are realized by software.

*Description of Operations*

Figure 11:
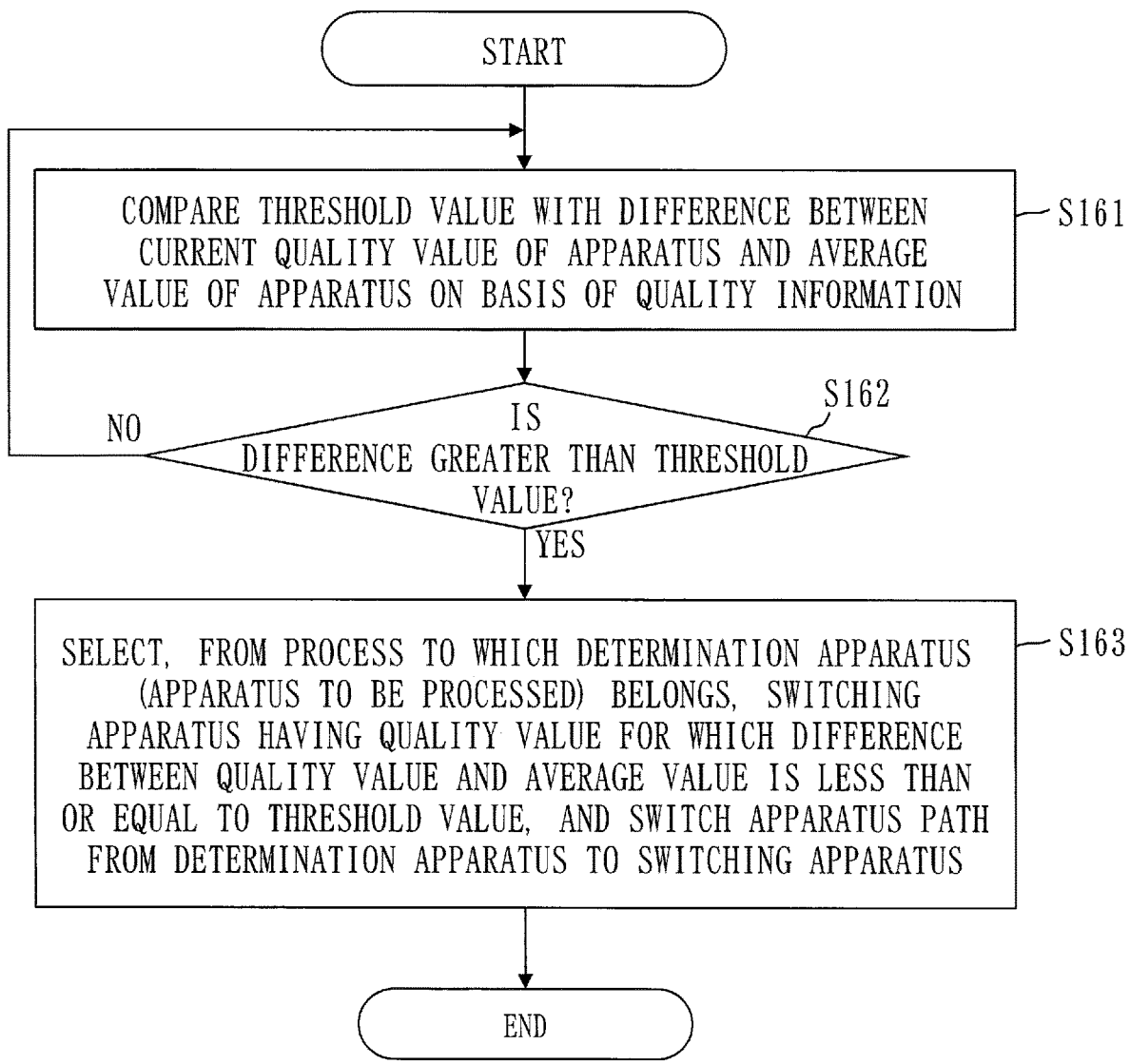
FIG. 11 is a flowchart illustrating the operations of a quality information determination unit 170 and an apparatus switching unit 180 according to the second embodiment.

The operations of the quality information determination unit 170 and the apparatus switching unit 180 according to the present embodiment will be described while referencing FIG. 11.

In step S161, the quality information determination unit 170 calculates an average value AQ of the quality value of each apparatus of the plurality of apparatuses 54 on the basis of the quality information 210 including the quality value of the intermediate product 52 processed by each apparatus of the plurality of apparatuses 54. Additionally, the quality information determination unit 170 determines whether a difference between a current quality value of each apparatus of the plurality of apparatuses 54 and the average value AQ is greater than a threshold value.

Specifically, the quality information determination unit 170 receives the quality information 210, which is the result of the inspection process acquired in real-time by the quality information acquisition unit 110, from the storage unit 160.

The quality information determination unit 170 uses the received quality information 210 to calculate the average value AQ of the quality value of the apparatus 54 on the basis of past quality distribution states of the apparatus 54. Additionally, the quality information determination unit 170 acquires the current quality value of the apparatus 54 from the received quality information 210 and calculates the difference between this current quality value and the average value AQ.

The threshold value 163 is stored in advance in the storage unit 160.

In step S162, the quality information determination unit 170 determines whether the difference is greater than the threshold value 163. When the difference is greater than the threshold value 163, the quality information determination unit 170 proceeds with the processing of step S163. When the difference is less than or equal to the threshold value 163, the quality information determination unit 170 returns to step S161 and executes the processing for a different apparatus.

In step S163, the apparatus switching unit 180 sets, as a determination apparatus D54, an apparatus for which the difference was determined to be greater than the threshold, and selects, from the process to which the determination apparatus D54 belongs, an apparatus having a quality value for which the difference between the quality value and the average value AQ is less than or equal to the threshold value as a switching apparatus C54. Then, the apparatus switching unit 180 sends a switching instruction 181 to the production facility 400 to switch the path from the determination apparatus D54 to the switching apparatus C54.

This ends the description of the operations of the quality information determination unit 170 and the apparatus switching unit 180.

The apparatus switching unit 180 may be configured to calculate an expected value for the final quality value, compare this expected value for the final quality value and the quality value of the product produced by the current apparatus path, and determine whether to switch the apparatus path on the basis of the comparison results. Specifically, the apparatus switching unit 180 automatically determines to switch from the current apparatus path to a different apparatus path when a difference between the expected value for the final quality value and the quality value of the product produced by the apparatus path falls within a preset final quality threshold value.

Next, a method for calculating the expected value for the final quality value by the apparatus switching unit 180 will be described. The apparatus switching unit 180 calculates by carrying out multiple regression analysis with the quality value of the final quality as an objective variable and other quality values included in the production line as explanatory variables. In this case, the regression coefficient will not be calculated correctly when there is strong correlation between the quality values serving as the explanatory variables. As such, as with the option of the process plan generation unit 140 of the first embodiment, quality values, as explanatory variables, that have strong correlation are omitted from the correlation coefficient information 161.

In the first embodiment, a method to provide an apparatus path has been described in which quality is improved, on the basis of correlation and the statistical distribution information of the quality values of each apparatus. In the present embodiment, processing in real-time is anticipated and, as such, a method is adopted in which the quality value of the final quality is formulated by the various quality values. In this case, the final quality is expressed as a linear combination of the various quality values or production conditions, and the regression coefficients thereof are each calculated in advance by an analysis method such as multiple regression analysis. The statistical distribution information of each quality value is saved for each apparatus path and, as such, it is possible to detect, in real-time, that a certain quality value has become a value distanced from the quality value expected for the currently selected apparatus path. Therefore, it is possible to determine an average value of the quality values of which of other apparatuses of the same process quality values are close to.

As a result, it is possible to acquire the average value for a future process from accumulated statistical information by substituting, as the explanatory variable of final quality, the quality values measured to-date of the process prior to the current process.

*Advantageous Effects of the Invention*

As described above, the plan generation apparatus according to the present embodiment is provided with the quality information determination unit to receive, in real-time, the values of the quality values measured in each inspection process when executing production, compare these values with the past distribution states of quality values, and determine whether it is necessary to switch the apparatuses. Additionally, the plan generation apparatus according to the present embodiment is provided with the apparatus switching unit to dynamically switch the apparatus to be used in the subsequent process. Therefore, with the plan generation apparatus according to the present embodiment, it is possible to dynamically estimate, on the basis of the quality value inspected in a current inspection process, an apparatus for a subsequent process that has the highest possibility of resolving variation that has occurred, and automatically change to that estimated apparatus path.

Additionally, as described above, according to the present embodiment, by monitoring the quality value of each inspection process, it is possible to automatically switch the apparatus path when a given deviation occurs, in a monitored value, from the statistically assumed expected value for the final quality. For example, in cases where it is determined that the quality value differs from the trend of the apparatus, even when the difference from the average value AQ has not fallen to an inspection-failing level, the apparatus path may be switched. It is thought that assigning a different apparatus, for which the quality value obtained in real-time is close to the average value, to the production will result in statistically improved quality.

Descriptions of embodiments of the invention have been given. Note that configurations are possible in which only one of, or any combination of several of, the constituents described as "units" in the Description of Embodiments are used. That is, provided that the functions described in the aforementioned embodiments can be realized, the function blocks of the plan generation apparatus are optional. These function blocks may be combined in any manner or provided with any block configuration to form the plan generation apparatus. Moreover, the plan generation apparatus may be a plan generation system configured from a plurality of apparatuses, instead of from a single apparatus.

While the first embodiment and the second embodiment have been described, the embodiments may be partially implemented or may be partially combined. That is, one of these two embodiments may be partially implemented. Moreover, any combination in part or in full of these two embodiments may be implemented.

The embodiments described above are merely preferred examples, and should not be construed to limit the invention or the scope of application and use of the invention. Various modification may be made to the invention as deemed necessary.

REFERENCE SIGNS LIST

31: first error, 32: second error, 50: process, 50a: process A, 50b: process B, 50x: process X, 50z: process Z, 51: raw material, 52, 52a, 52b, 52x, 52z: intermediate product, 53: product, 54: apparatus, 55, 55a, 55b,55z, 55x: inspection and transportation process, 100, 100a: plan generation apparatus, 110: quality information acquisition unit, 120: correlation determination unit, 130: set determination unit, 170: quality information determination unit, 180: apparatus switching unit, 140: process plan generation unit, 160: storage unit, 161: correlation coefficient information, 162: combination information, 163: threshold value, 164: quality standard value BQ, 151, 151a, 151b, 151x, 151z: process plan, 200: database, 170: quality information determination unit, 180: apparatus switching unit, 181: switching instruction, 210: quality information, 211, 211α, 211a, 211b, 211x: quality information by process, 212, 213, 214, 215: link, 300: production plan information, 400: production facility, 510: plan generation method, 520: plan generation program, 540: set of apparatuses, 901: processor, 902: storage device, 903: input interface, 910: communication device, 911: receiver, 912: transmitter, 909: processing circuit, Q, Q1, Q2: quality value, BQ: quality standard value, AQ: average value, S100 plan generation processing, S110: quality information acquisition processing, S120: correlation determination processing, S130: set determination processing, S140: process plan generation processing, ST1: first correlation coefficient, ST2: second correlation coefficient, ST3: third correlation coefficient, T154: first apparatus, T254: second apparatus, T354: third apparatus, T1Q: first quality value, T2Q: second quality value, T3Q: third quality value, C54: switching apparatus, D54: determination apparatus.

The invention claimed is:

1. A plan generation apparatus that generates a process plan of a product to be produced via a plurality of processes, the plan generation apparatus comprising
processing circuitry to:
define a first apparatus as one apparatus among a plurality of apparatuses, each apparatus of the plurality of apparatuses that belongs to one of the plurality of processes,
define a first quality value as a quality value indicating a quality of an intermediate product processed by the first apparatus,
define a second apparatus as an apparatus among the plurality of apparatuses that belongs to a process prior to the process to which the first apparatus belongs,
define a second quality value as a quality value of an intermediate product processed by the second apparatus, and
determine whether correlation exists between the first quality value and the second quality value;
determine, using a quality reference value indicating a reference value for quality of the intermediate product, whether the first apparatus and the second apparatus are a set of apparatuses for which a first error between the first quality value and the quality reference value and a second error between the second quality value and the quality reference value cancel each other out when it is determined that correlation exists between the first quality value and the second quality value; and generate the process plan using the set of apparatuses when it is determined that the first apparatus and the second apparatus are the set of apparatuses.

2. The plan generation apparatus according to claim 1, wherein the processing circuitry
determines that the first apparatus and the second apparatus are the set of apparatuses when a negative correlation exists between the first quality value and the second quality value and, also, positives/negatives of the first error and the second error are identical, and
determines that the first apparatus and the second apparatus are the set of apparatuses when a positive correlation exists between the first quality value and the second quality value and, also, positives/negatives of the first error and the second error are different.

3. The plan generation apparatus according to claim 1, wherein the processing circuitry
calculates a correlation coefficient between the first quality value and the second quality value as a first correlation coefficient, and
determines whether correlation exists between the first quality value and the second quality value on the basis of the first correlation coefficient.

4. The plan generation apparatus according to claim 1, wherein the processing circuitry
detects, as a third apparatus, an apparatus having correlation with the second apparatus and also having correlation with the first apparatus among apparatuses belonging to processes prior to the process to which the second apparatus belongs,
defines a third quality value as a quality value of the third apparatus,
calculates a partial correlation coefficient on the basis of a second correlation coefficient and a third correlation coefficient, the second correlation coefficient being a correlation coefficient between the third quality value and the second quality value and the third correlation coefficient being a correlation coefficient between the third quality value and the first quality value, and
determines whether correlation exists between the first quality value and the second quality value on the basis of the partial correlation coefficient that was calculated.

5. The plan generation apparatus according to claim 1, wherein the processing circuitry
calculates an average value of the quality value of each apparatus of the plurality of apparatuses on the basis of quality information including the quality value of the intermediate product processed by each apparatus of the plurality of apparatuses, and determines whether a difference between a current quality value of each apparatus of the plurality of apparatuses and the average value is greater than a threshold value, and
defines, as a determination apparatus, an apparatus for which the difference was determined to be greater than the threshold,
selects, from a process to which the determination apparatus belongs, an apparatus having a quality value for which the difference between the quality value and the average value is less than or equal to the threshold value as a switching apparatus, and
switches a path from the determination apparatus to the switching apparatus.

6. A plan generation method of a plan generation apparatus that generates a process plan of a product to be produced via a plurality of processes, the plan generation method comprising:

defining a first apparatus as one apparatus among a plurality of apparatuses, each apparatus of the plurality of apparatuses that belongs to one of the plurality of processes,
defining a first quality value as a quality value indicating a quality of an intermediate product processed by the first apparatus,
defining a second apparatus as an apparatus among the plurality of apparatuses that belongs to a process prior to the process to which the first apparatus belongs,
defining a second quality value as a quality value of an intermediate product processed by the second apparatus, and
determining whether correlation exists between the first quality value and the second quality value;
determining, using a quality reference value indicating a reference value of quality of the intermediate product, whether the first apparatus and the second apparatus are a set of apparatuses for which a first error between the first quality value and the quality reference value and a second error between the second quality value and the quality reference value cancel each other out when it is determined that correlation exists between the first quality value and the second quality value; and
generating the process plan using the set of apparatuses when it is determined that the first apparatus and the second apparatus are the set of apparatuses.

7. A non-transitory computer readable medium storing a plan generation program of a plan generation apparatus that generates a process plan of a product to be produced via a plurality of processes, the plan generation program being configured to cause a computer to execute:
correlation determination processing to
define a first apparatus as one apparatus among a plurality of apparatuses, each apparatus of the plurality of apparatuses that belongs to one of the plurality of processes,
define a first quality value as a quality value indicating a quality of an intermediate product processed by the first apparatus,
define a second apparatus as an apparatus among the plurality of apparatuses that belongs to a process prior to the process to which the first apparatus belongs,
define a second quality value as a quality value of an intermediate product processed by the second apparatus, and
determine whether correlation exists between the first quality value and the second quality value;
set determination processing to determine, using a quality reference value indicating a reference value of quality of the intermediate product, whether the first apparatus and the second apparatus are a set of apparatuses for which a first error between the first quality value and the quality reference value and a second error between the second quality value and the quality reference value cancel each other out when it is determined that correlation exists between the first quality value and the second quality value; and
process plan generation processing to generate the process plan using the set of apparatuses when it is determined that the first apparatus and the second apparatus are the set of apparatuses.

8. The plan generation apparatus according to claim 2, wherein the processing circuitry calculates a correlation coefficient between the first quality value and the second quality value as a first correlation coefficient, and determines whether correlation exists between the first quality value and the second quality value on the basis of the first correlation coefficient.

9. The plan generation apparatus according to claim 2, wherein the processing circuitry calculates an average value of the quality value of each apparatus of the plurality of apparatuses on the basis of quality information including the quality value of the intermediate product processed by each apparatus of the plurality of apparatuses, and determines whether a difference between a current quality value of each apparatus of the plurality of apparatuses and the average value is greater than a threshold value, and defines, as a determination apparatus, an apparatus for which the difference was determined to be greater than the threshold, selects, from a process to which the determination apparatus belongs, an apparatus having a quality value for which the difference between the quality value and the average value is less than or equal to the threshold value as a switching apparatus, and switches a path from the determination apparatus to the switching apparatus.

10. The plan generation apparatus according to claim 3, wherein the processing circuitry calculates an average value of the quality value of each apparatus of the plurality of apparatuses on the basis of quality information including the quality value of the intermediate product processed by each apparatus of the plurality of apparatuses, and determines whether a difference between a current quality value of each apparatus of the plurality of apparatuses and the average value is greater than a threshold value, and defines, as a determination apparatus, an apparatus for which the difference was determined to be greater than the threshold, selects, from a process to which the determination apparatus belongs, an apparatus having a quality value for which the difference between the quality value and the average value is less than or equal to the threshold value as a switching apparatus, and switches a path from the determination apparatus to the switching apparatus.

11. The plan generation apparatus according to claim 4, wherein the processing circuitry calculates an average value of the quality value of each apparatus of the plurality of apparatuses on the basis of quality information including the quality value of the intermediate product processed by each apparatus of the plurality of apparatuses, and determines whether a difference between a current quality value of each apparatus of the plurality of apparatuses and the average value is greater than a threshold value, and defines, as a determination apparatus, an apparatus for which the difference was determined to be greater than the threshold, selects, from a process to which the determination apparatus belongs, an apparatus having a quality value for which the difference between the quality value and the average value is less than or equal to the threshold value as a switching apparatus, and switches a path from the determination apparatus to the switching apparatus.

* * * * *